(12) United States Patent
Lee et al.

(10) Patent No.: US 8,949,894 B2
(45) Date of Patent: Feb. 3, 2015

(54) APPARATUS FOR PROVIDING MULTIPLE SCREENS AND METHOD OF DYNAMICALLY CONFIGURING MULTIPLE SCREENS

(75) Inventors: Jong-ho Lee, Hwaseong-si (KR); Kwang-kee Lee, Seoul (KR); Un-gyo Jung, Seoul (KR); Glenn A. Adams, Cambridge, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 659 days.

(21) Appl. No.: 11/496,545

(22) Filed: Aug. 1, 2006

(65) Prior Publication Data

US 2007/0035471 A1 Feb. 15, 2007

Related U.S. Application Data

(60) Provisional application No. 60/705,491, filed on Aug. 5, 2005, provisional application No. 60/789,577, filed on Apr. 6, 2006, provisional application No. 60/812,090, filed on Jun. 9, 2006.

(51) Int. Cl.
*G06F 3/00* (2006.01)
*G06F 3/03* (2006.01)
*H04N 5/45* (2011.01)
(Continued)

(52) U.S. Cl.
CPC .................. *G09G 5/14* (2013.01); *H04N 5/445* (2013.01); *H04N 5/44591* (2013.01); *H04N 5/45* (2013.01); *H04N 21/4312* (2013.01); *H04N 21/4314* (2013.01); *H04N 21/4316* (2013.01); *H04N 21/443* (2013.01); *H04N 21/4622* (2013.01); *G09G 2340/0407* (2013.01);
(Continued)

(58) Field of Classification Search
CPC .... H04N 21/482; H04N 5/4403; H04N 21/47
USPC ................ 725/41, 37–40, 43, 47, 49, 54, 59; 348/461, 462, 553, 563–568
See application file for complete search history.

(56) References Cited

U.S. PATENT DOCUMENTS 5,192,999 A 3/1993 Graczyk et al.
5,347,624 A 9/1994 Takanashi et al.
(Continued)

FOREIGN PATENT DOCUMENTS

EP 725539 A2 8/1996
EP 1073270 A1 1/2001
(Continued)

OTHER PUBLICATIONS

Communication issued on Jun. 4, 2010 by the European Patent Office in counterpart European Application No. 06823621.5.
(Continued)

*Primary Examiner* — Benjamin R Bruckart
*Assistant Examiner* — Jason Thomas
(74) *Attorney, Agent, or Firm* — Sughrue Mion, PLLC

(57) ABSTRACT

An apparatus and method for providing multiple screens is provided. The apparatus for providing multiple screens includes a service processing module providing a plurality of services, an interface module through which an audio content is independently selected from the plurality of services, and an output module outputting the selected audio content.

30 Claims, 22 Drawing Sheets

(51) Int. Cl.
*H04N 21/274* (2011.01)
*G09G 5/14* (2006.01)
*H04N 5/445* (2011.01)
*H04N 21/431* (2011.01)
*H04N 21/443* (2011.01)
*H04N 21/462* (2011.01)

(52) U.S. Cl.
CPC ... *G09G 2340/0464* (2013.01); *G09G 2340/10* (2013.01); *G09G 2340/12* (2013.01); *G09G 2340/125* (2013.01)
USPC .............................................. 725/41; 725/43

(56) References Cited

U.S. PATENT DOCUMENTS

| | | | | |
|---|---|---|---|---|
| 5,990,927 | A * | 11/1999 | Hendricks et al. | 725/132 |
| 6,204,887 | B1 * | 3/2001 | Hiroi | 348/565 |
| 6,456,334 | B1 * | 9/2002 | Duhault | 348/565 |
| 6,792,615 | B1 * | 9/2004 | Rowe et al. | 725/37 |
| 6,917,362 | B2 | 7/2005 | Pinedo et al. | |
| 2002/0067433 | A1 * | 6/2002 | Yui et al. | 348/588 |
| 2003/0005447 | A1 * | 1/2003 | Rodriguez | 725/51 |
| 2003/0179283 | A1 | 9/2003 | Seidel et al. | |
| 2003/0217369 | A1 * | 11/2003 | Heredia | 725/152 |
| 2004/0117044 | A1 * | 6/2004 | Konetski | 700/94 |
| 2005/0273838 | A1 * | 12/2005 | Witheiler | 725/126 |
| 2006/0026318 | A1 | 2/2006 | Lee | |

FOREIGN PATENT DOCUMENTS

| | | |
|---|---|---|
| JP | 5-056369 A | 3/1993 |
| JP | 5-75949 A | 3/1993 |
| JP | 2000-295542 A | 10/2000 |
| KR | 1998-048945 A | 9/1998 |
| KR | 2002-0078256 A | 10/2002 |
| WO | 97/36391 | 10/1997 |

OTHER PUBLICATIONS

Morris, S., et al., "Interactive TV Standards: A Guide to MHP, OCAP, and Java TV", 2005, pp. 89-98, 118-178, ch. 5, 7, Focal Press, Elsevier.

Communication dated Nov. 29, 2007, issued by the Korean Intellectual Property Office in counterpart Korean Patent Application No. 10-2006-0073118.

* cited by examiner

ABSTRACT SERVICE

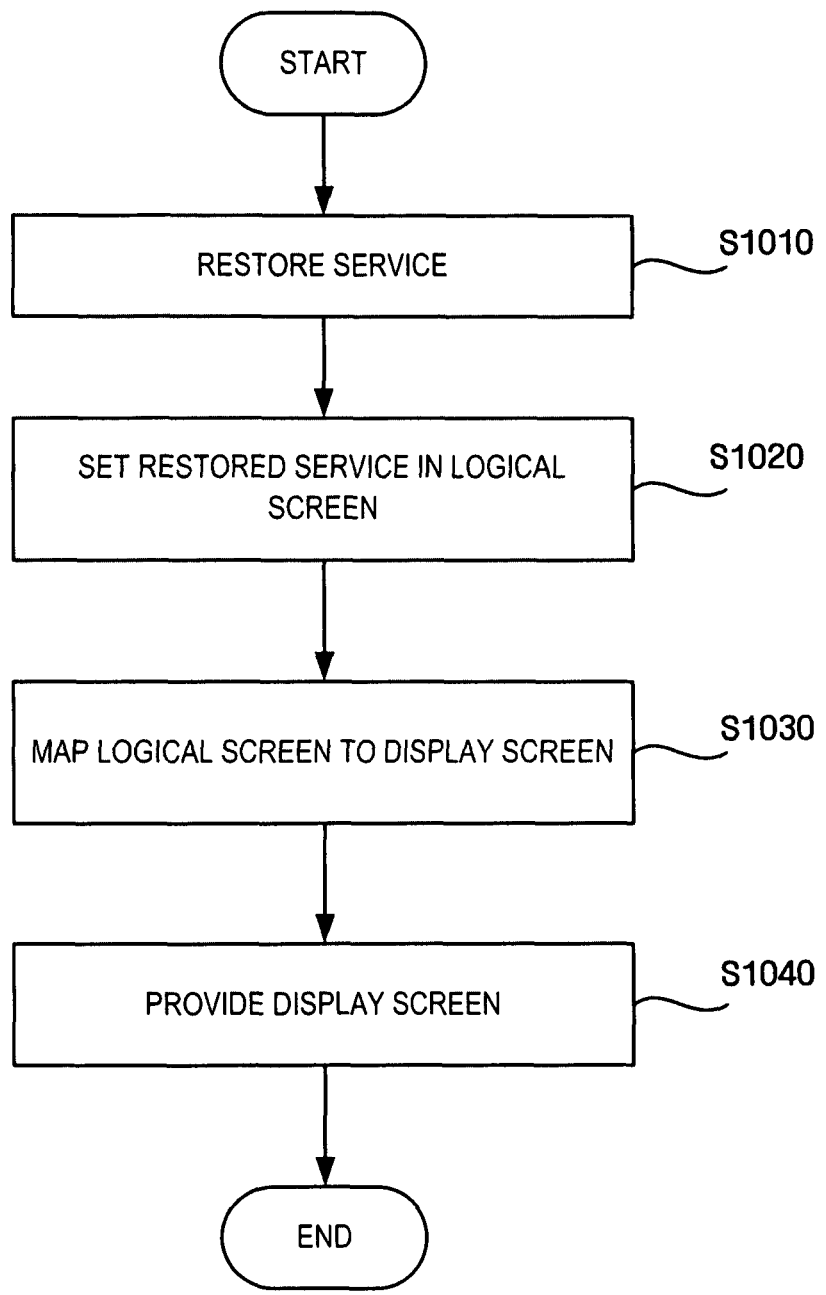

APPARATUS FOR PROVIDING MULTIPLE SCREENS AND METHOD OF DYNAMICALLY CONFIGURING MULTIPLE SCREENS

CROSS-REFERENCES TO RELATED APPLICATIONS

This application claims priority from U.S. Provisional Patent Application Nos. 60/705,491, 60/789,577 and 60/812,090 filed on Aug. 5, 2005, Apr. 6, 2006 and Jun. 9, 2006, respectively, in the United States patent and Trademark Office, the disclosures of which are incorporated herein by reference in their entirety.

BACKGROUND OF THE INVENTION

1. Field of the Invention

Apparatuses and methods consistent with the present invention relate to configuring multiple screens, and more particularly, to dynamically configuring multiple screens which provide multiple contents on a single physical display device 2. Description of the Related Art Related art broadcast receivers such as digital televisions (TVs) or digital set-top boxes provide only one content element on a single physical display device or simultaneously display a main screen and a sub-screen on a single physical display device.

Even though related art broadcast receivers can simultaneously display both the main screen and the sub-screen on the same display screen, they can only arrange the main screen and the sub-screen in a limited number of manners. In the case of a content displayed within the main screen, all elements of the content, i.e., video data, audio data, and other data, are displayed. On the other hand, in the case of a content displayed within the sub-screen, only some of the elements of the content are displayed.

Content sources include a broadcast service such as a satellite broadcaster, a terrestrial broadcaster, or a cable broadcaster, a storage medium such as digital versatile discs DVDs, or an external device connected to an input terminal. However, it is quite difficult to display contents provided by such various content sources on a display screen using the existing broadcast receivers.

In an interactive TV application program environment such as the Multimedia Home Platform (MHP), the Advanced Common Application (ACAP), and the Open Cable Application Platform (OCAP), it is assumed that only one screen is output on a physical display device.

In the interactive TV application program environment, for example, a Home Audio/Video Interoperability (HAVi)-based user interface (UI) is adopted. According to the HAVi UI standard, even though no restriction is imposed on the number of screens displayed on a physical display device, only one screen is generally displayed on a physical display device.

In such an environment, it is difficult to perform operations, such as decoding, digital signal processing, user interaction processing, etc. with respect to one among multimedia contents displayed on a screen while displaying the multimedia contents on independent screens. In addition, it is also difficult to dynamically control the life cycles of application programs and the use of resources in the units of the screens.

Accordingly, there exists a need for a method of displaying a variety of contents on a dynamically configured screen.

SUMMARY OF THE INVENTION

The present invention provides a dynamic configuration of multiple screens which provide a plurality of contents on a physical display device.

The present invention also provides a method of independently selecting and outputting an audio content provided in individual services.

According to an aspect of the present invention, there is provided an apparatus for providing multiple screens, the apparatus including a service processing module providing a plurality of services, a user/application interface module through which an audio content is independently selected from the plurality of services, and an output module outputting the selected audio content.

According to another aspect of the present invention, there is provided an apparatus for providing multiple screens, the apparatus including a user/application interface module receiving a selection for a specific service, and an output module outputting an audio content of the selected service independently of the selected service.

According to another aspect of the present invention, there is provided an apparatus for providing multiple screens, the apparatus including a user/application interface module through which an audio content of a specific service is independently selected, and an output module outputting the selected audio content.

According to another aspect of the present invention, there is provided a method of providing multiple screens, the method including independently selecting an audio content from a plurality of services provided at the same time, and outputting the selected audio content.

According to another aspect of the present invention, there is provided a method of providing multiple screens, the method including selecting a specific service, extracting an audio content from the selected service, and outputting the extracted audio content.

According to another aspect of the present invention, there is provided a method of providing multiple screens, the method including independently selecting an audio content from a specific service, and outputting the selected audio content.

BRIEF DESCRIPTION OF THE DRAWINGS

The above and other aspects of the present invention will become more apparent by describing in detail exemplary embodiments thereof with reference to the attached drawings, in which:

FIG. 11 is a flowchart illustrating a method of dynamically configuring multiple screens according to an exemplary embodiment of the present invention;

DETAILED DESCRIPTION OF EXEMPLARY EMBODIMENTS OF THE INVENTION

Figure 1A:
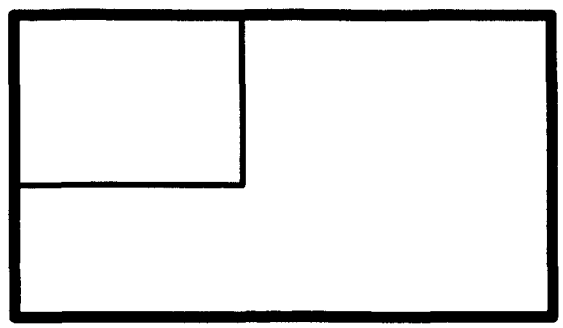
FIGS. 1A to 1H are diagrams illustrating configurations of a PiP screen according to exemplary embodiments of the present invention.
Figure 1B:
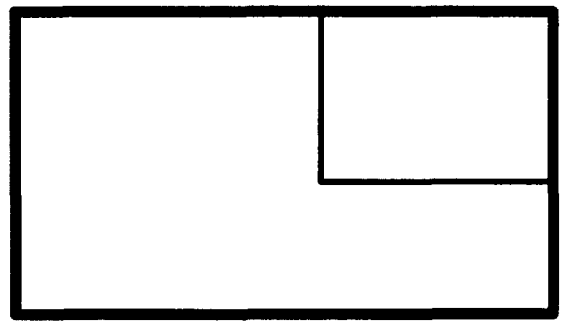
Figure 1C:
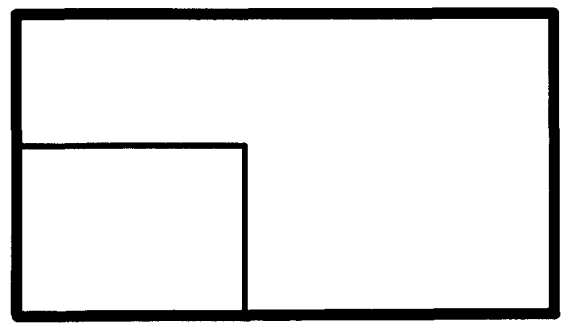
Figure 1D:
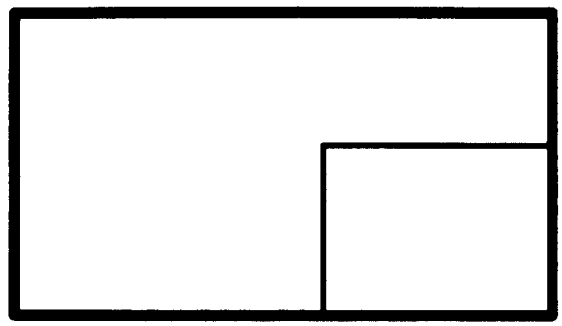

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks illustrated in succession may in fact be executed substantially concurrently or the blocks may sometimes be executed in the reverse order, depending upon the functionality involved.

For a better understanding of the present invention, the terms used in this disclosure will now be defined.

The term 'service' indicates a group of multimedia contents displayed together, i.e., a group of service components.

Service components are elements of a service and include a video component, an audio component, and a data component. A data component is an application program in a service.

Applications can be classified as unbound applications and service bound applications. The unbound application is not related to a specific channel, and thus the execution of the application is not effected by channel switching. Further, the unbound application usually has a high priority, and therefore resources for executing the application are smoothly assigned to the application. A monitor application corresponds to one of specific unbound applications capable of having the highest priority.

Meanwhile, the service bound application relates to a transport stream and usually has a low priority as compared to the unbound application. The service bound application does not perform any critical system function. For this reason, when competition for resources occurs, a possibility for the service bound application to abandon resource assignment is higher as compared to the unbounded application. The service bound applications can be classified as a linked type of operating in cooperation with a stream being currently transmitted and an unlinked type of operating regardless of a stream being currently transmitted.

The term 'service context' indicates an object which can control the executing of a service and includes various resources, devices, and execution state information needed for providing a service.

The term 'physical display device' indicates a physical space which actually displays the content of a service, an external output port outputting the content of a service, or a storage device storing a service.

The term 'display screen' indicates a screen actually displayed on a physical display device. An arbitrary service may be directly set in the display screen, and the display screen may be displayed on a physical display device. Alternatively, at least one logical screen which is mapped to a certain area of the display screen may be displayed on the physical display device.

The term 'logical screen' indicates a space in which an arbitrary service is displayed. A logical screen is a virtual screen before being mapped to a display screen and thus is not displayed on a physical display device.

The logical screen and the display screen may be a combination of a background still image, a video raster, and a graphic raster. The graphic raster may be a combination of text, lines, colors, and images or a mixture of video frames.

The term 'main service' indicates a service that is selected as a main service through a menu displayed on the physical display device or a remote controller by a user or through an API by an application, and the screen on which the main service is displayed is referred to as a 'main screen'.

The term 'Picture-in-Picture service' (PiP service) indicates a service that is selected as a sub-service in the main service through a menu displayed on a physical display device or a remote controller by a user via an API by an application, and the PiP service may be displayed on a picture-in-picture screen (PiP screen) or a main screen.

Figure 1E:
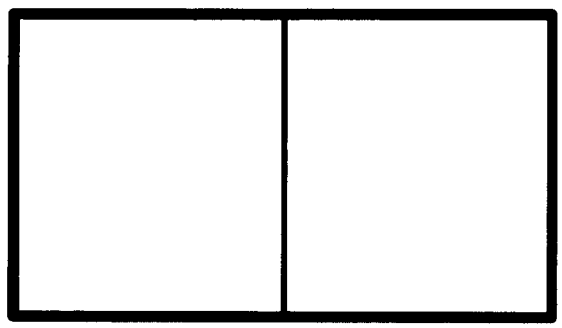
Figure 1F:
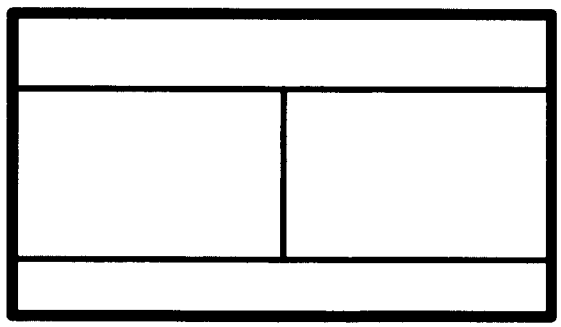
Figure 1G:
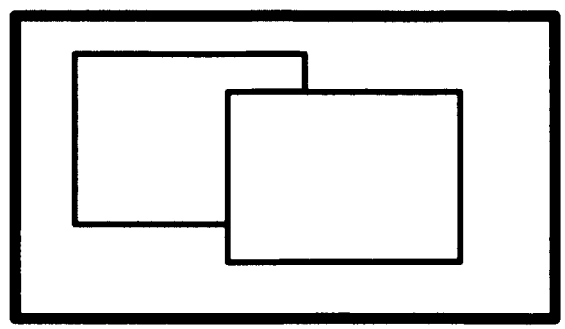
Figure 1H:
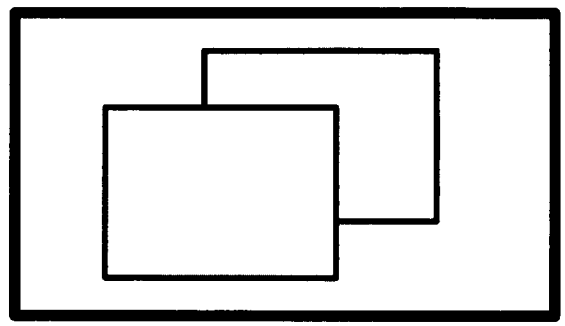

The PiP screen includes a screen that occupies a part of another screen as illustrated in FIGS. 1A to 1D and a screen that is simultaneously displayed with another screen without overlapping the other screen as illustrated in FIGS. 1E to 1F. In this case, it is understood that the PiP screen may include a screen that is displayed on an arbitrary location or area in the physical display device or overlaps another screen, as illustrated in FIGS. 1G and 1H.

Figure 2:
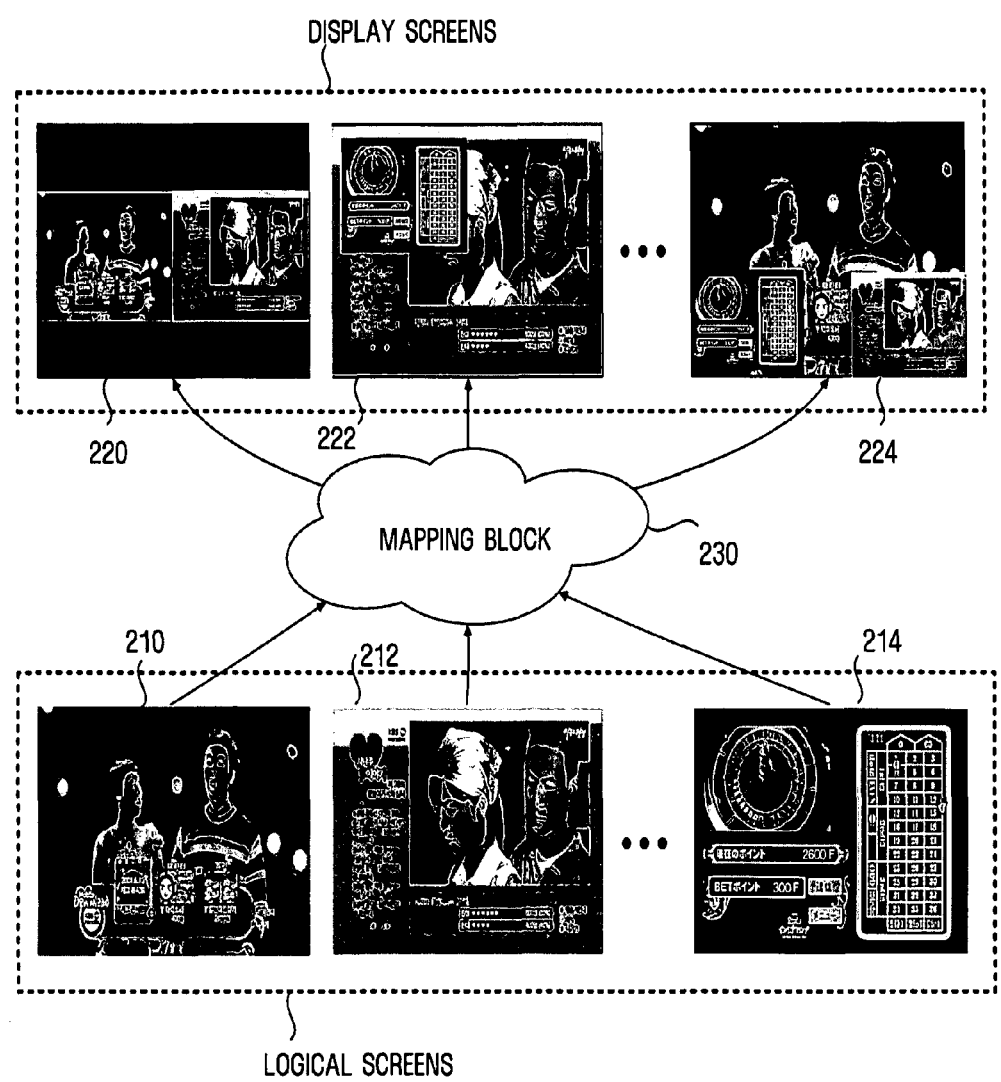
FIG. 2 is a diagram illustrating the relationship between a logical screen and a display screen according to an exemplary embodiment of the present invention.

FIG. 2 is a diagram illustrating the relationship between a logical screen and a display screen according to an exemplary embodiment of the present invention.

Referring to FIG. 2, a service may be displayed using logical screens 210, 212, and 214. The logical screens 210, 212, and 214 are mapped to display screens 220, 222, and 224 through a mapping block 230.

In detail, the logical screens 210 and 212 are mapped to the display screen 220, the logical screens 212 and 214 are mapped to the display screen 222, and the logical screens 210, 212, and 214 are mapped to the display screen 224.

In short, at least one logical screen which displays a service is mapped to an arbitrary area of a display screen.

The mapping block 230 is a group of various pieces of information needed for mapping a logical screen to a display screen. Examples of the various pieces of information include coordinate information of a predetermined area on a display screen to which each of a plurality of logical screens is mapped, identification information of the logical screens and the display screen, and information specifying in what order the logical screens are displayed on the display screen.

The mapping block 230 can change the size of the logical screen so to be allocated in an arbitrary area of the display screen. That is, the mapping block 230 can perform scaling of the logical screen and allocating of the position thereof, and FIGS. 3A to 3E are diagrams illustrating a configuration of the screen including a mapper as the mapping block.

Figure 3A:
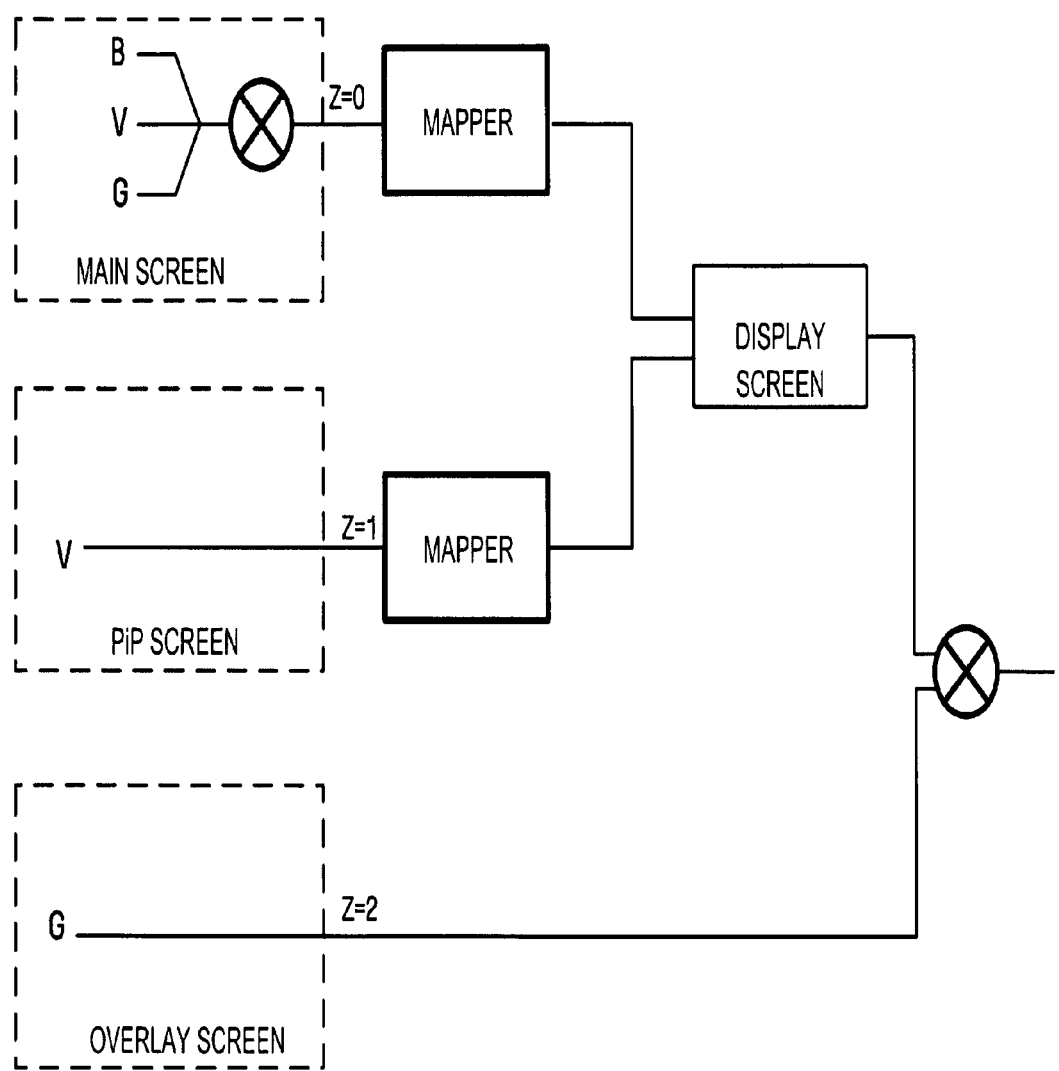
FIGS. 3A to 3E are diagrams illustrating a configuration of a screen including a mapper according to an exemplary embodiment of the present invention.
Figure 3B:
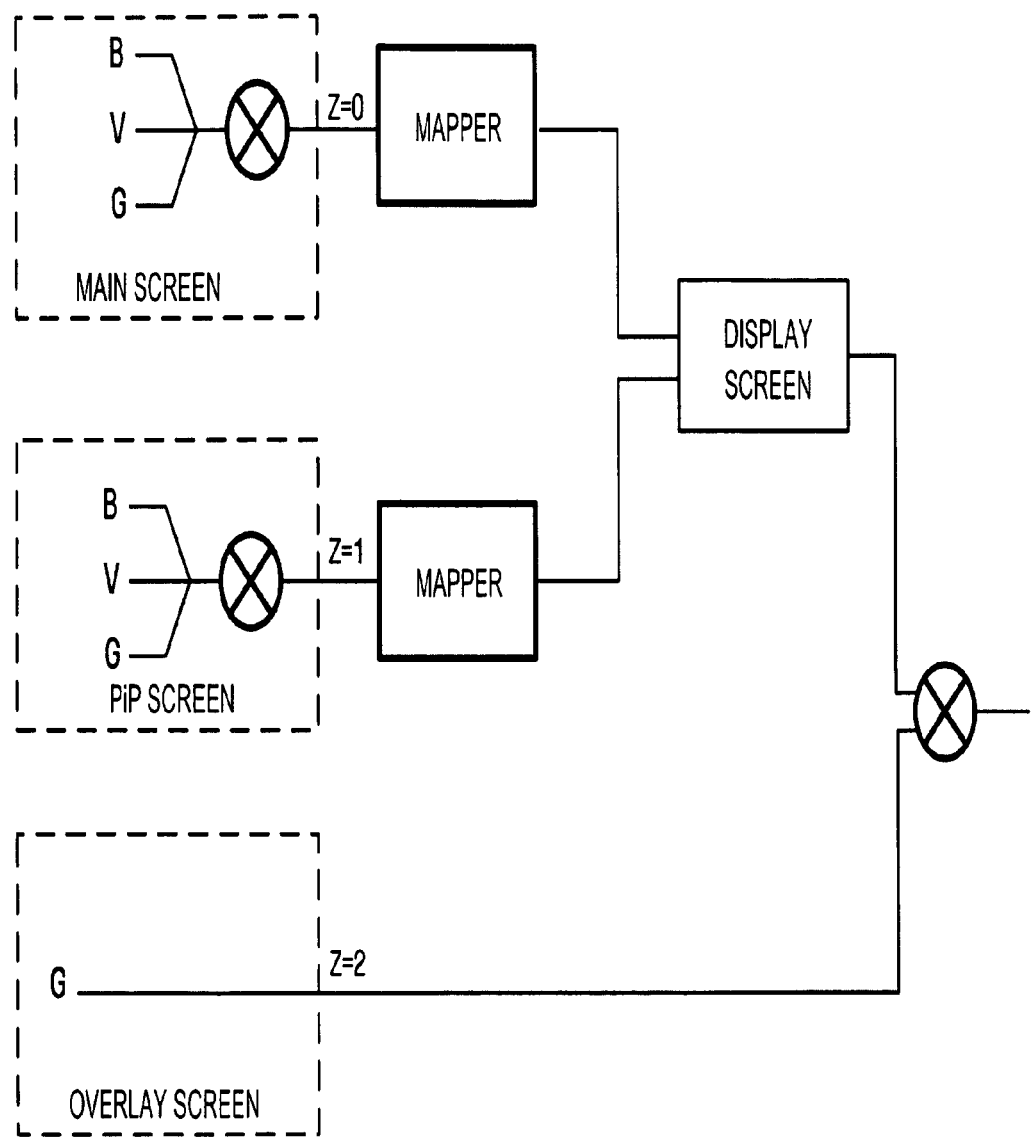

Referring to FIG. 3A, the main screen including a combination of a background still image B, a video raster V, and a graphic raster G is mapped to the entire display screen by a mapper with a normal size. The PiP screen including only video components is mapped to the entire display screen by the mapper with a reduced size. In this case, the mapped PiP screen is displayed on the main screen, which is determined depending on a Z value. The reference character Z refers to z-order value which will be described later. An overlay screen may be combined with the display screen. The overlay screen is a specific screen disposed at the outmost side, and may be used when providing a caption function. The PiP screen may have only a video component as illustrated in FIG. 3A, or may have a combination of the background still image B, the video raster V, and the graphic rater G as illustrated in FIG. 3B.

Figure 3C:
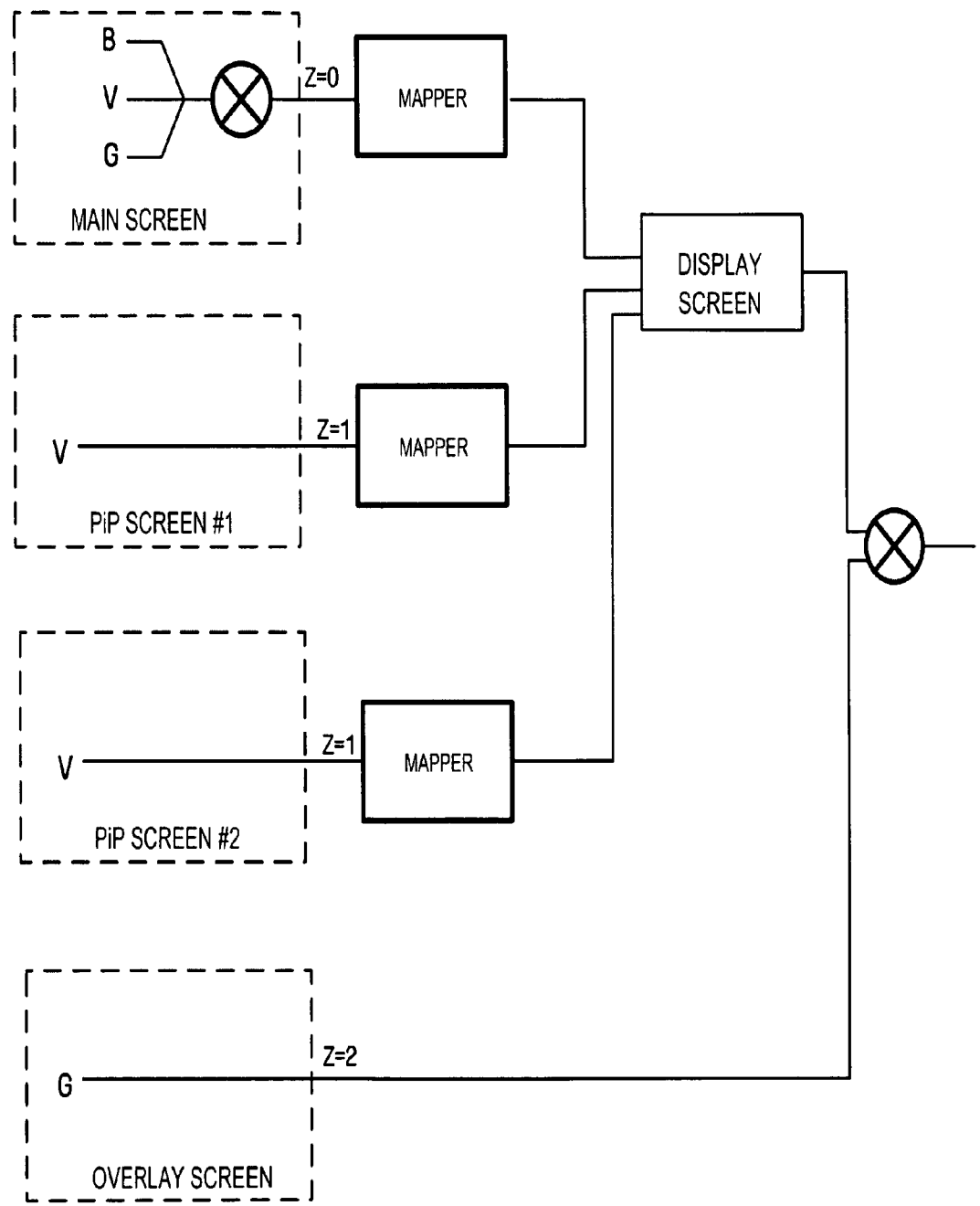
Figure 3D:
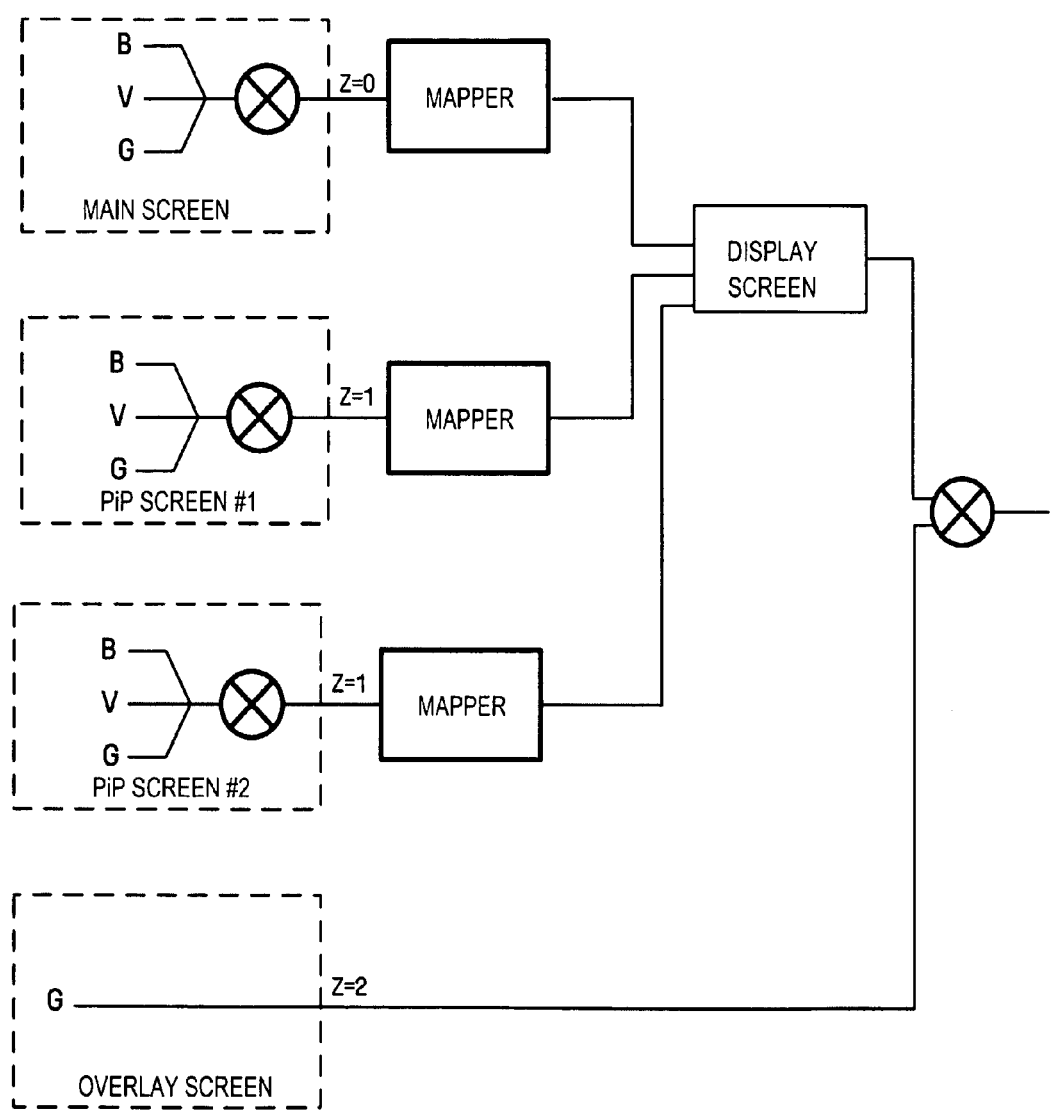

Referring to FIG. 3C, the main screen including the combination of the background still image B, the video raster V, and the graphic rater G is mapped to the entire display screen by the mapper with a normal size. Two PiP screens #1 and #2 having only video component is mapped to an arbitrary area of the display screen by the mapper with a reduced size. In this case, the mapped PiP screen is disposed on the main screen and the Z value can be constantly maintained. Further, the overlay screen may be combined with the display screen. The configuration of the screen may have a plurality of PiP screens including only video components as illustrated in FIG. 3C or a plurality of PiP screens including a combination of the background still image B, the video raster V, and the graphic rater G as illustrated in FIG. 3D.

Figure 3E:
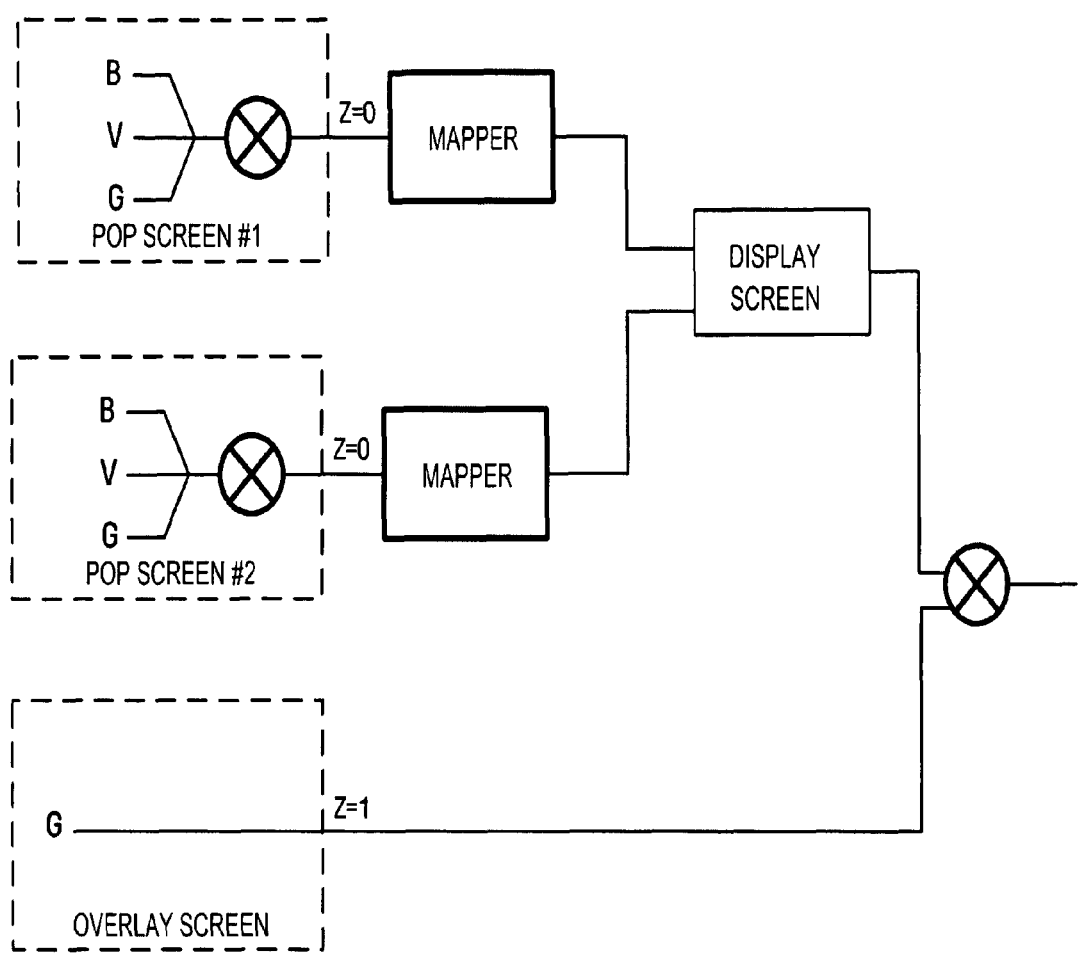

Picture-outside-picture (POP) screens are illustrated in FIG. 3E. It can be understood that a known PiP screen is displayed inside the main screen and the POP screen is displayed outside the main screen. Referring to FIG. 3E, the plurality of PiP screens #1 and #2 including a combination of the background still image B, the video raster V, and the graphic rater G are mapped to arbitrary areas of the display screen by the mapper with a reduced size. In this case, the Z value of the mapped POP screens #1 and #2 may be constantly maintained. Further, the overlay screen may be combined with the display screen.

The mapping block 230 may be realized by interfaces or functions prepared by various computer program languages to be executed and create or change the relationship between the logical screen and the display screen by using the above information as parameters.

Alternatively, the mapping block 230 may be realized by hardware to perform a mapping function between the logical screen and the display screen.

Figure 4:
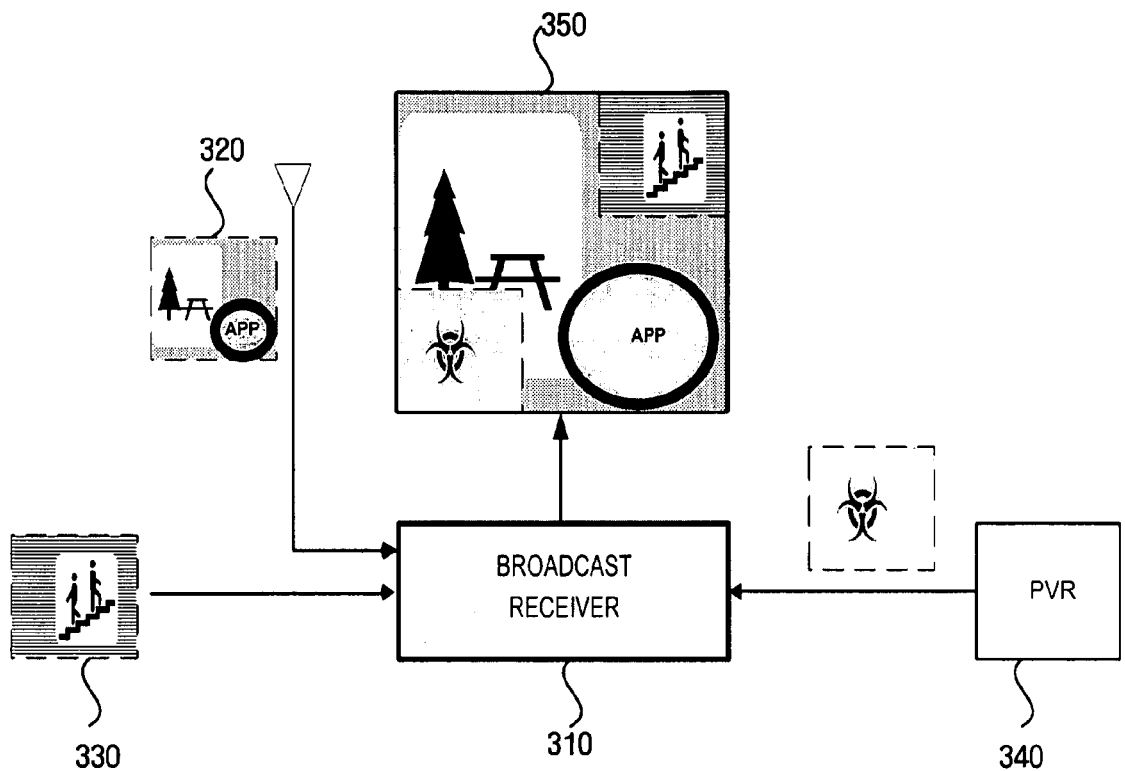
FIG. 4 is a block diagram illustrating service sources according to an exemplary embodiment of the present invention.

Further, services provided by various service sources may be displayed on a display screen, and the display screen may be displayed on a physical display device, as illustrated in FIG. 4.

There are service sources which provide broadcast services such as a terrestrial broadcaster 320 and a cable broadcaster 330, service sources which provide services stored in a storage medium such as a personal video recorder (PVR) 340, and service sources (not illustrated in FIG. 4) which provide services via a wired network or a wireless network.

A broadcast receiver 310 receives services from the service sources and produces logical screens displaying each of the received services.

Then, an arbitrary service is directly set on the display screen to be displayed on a physical display device using a predefined method or a method set by a user or an application. Otherwise, at least one logical screen that is mapped to an arbitrary area on the display screen is displayed on a physical display device 350. In short, services provided by the terrestrial broadcaster 320, the cable broadcaster 330, and the PVR are displayed on the physical display device 350.

The terrestrial broadcaster 320, the cable broadcaster 330, and the PVR 340 are illustrated in FIG. 4 as being service sources, but the present invention is not limited to it. Any type of multimedia content source which provides multimedia contents that can be displayed together can be a service source according to an exemplary embodiment of the present invention.

Figure 5A:
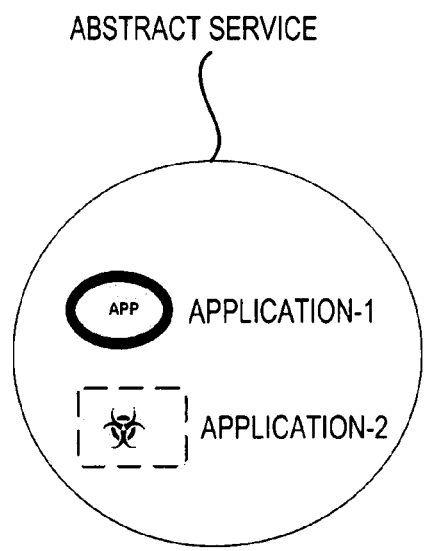
FIGS. 5A and 5B are diagrams illustrating a non-abstract service and an abstract service according to an exemplary embodiment of the present invention.
Figure 5B:
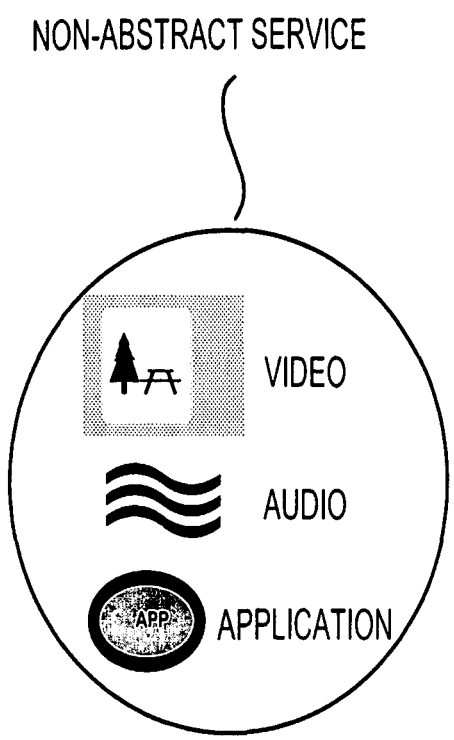

Services according to an exemplary embodiment of the present invention can be classified into abstract services and non-abstract services, as illustrated in FIGS. 5A and 5B.

The abstract services are not services provided by broadcast signals transmitted in real time but services independent of broadcast channels. The abstract services include only data components, i.e., application programs, without video components and audio components. Examples of the abstract services include services having unbound applications based on the OCAP) standard.

The non-abstract services are understood as services other than abstract services.

According to the current exemplary embodiment of the present invention, both abstract services and non-abstract services have independency. For example, abstract services may be directly set on the physical display device not through logical screens and non-abstract services may be displayed on the logical screens. Then, the logical screens may be mapped to the display screen in which the abstract services are set. Thereafter, the display screen may be output through the physical display device. By doing so, the abstract services can be displayed on the display screen independently of the non-abstract services. In addition, the abstract services and non-abstract services may be mapped to different logical screens. Thereafter, the logical screens may be mapped to a single display screen. In other words, the abstract services can be displayed on the display screen independently of non-abstract services.

According to the current exemplary embodiment of the present invention, the logical screen and the display screen may be categorized as being different objects. Alternatively, a screen may serve as a logical screen or a display screen according to attribute information of one screen object.

In detail, whether a screen is a logical screen or a display screen can be known through type information of attribute information on the screen object.

Attribute information of the screen object includes a plurality of attributes 'Type', 'z-Order', 'Display_Area', 'Visibility', 'Associated_Display_Screen', 'Associated_Service_Contexts', and 'OutputPort'.

Figure 6:
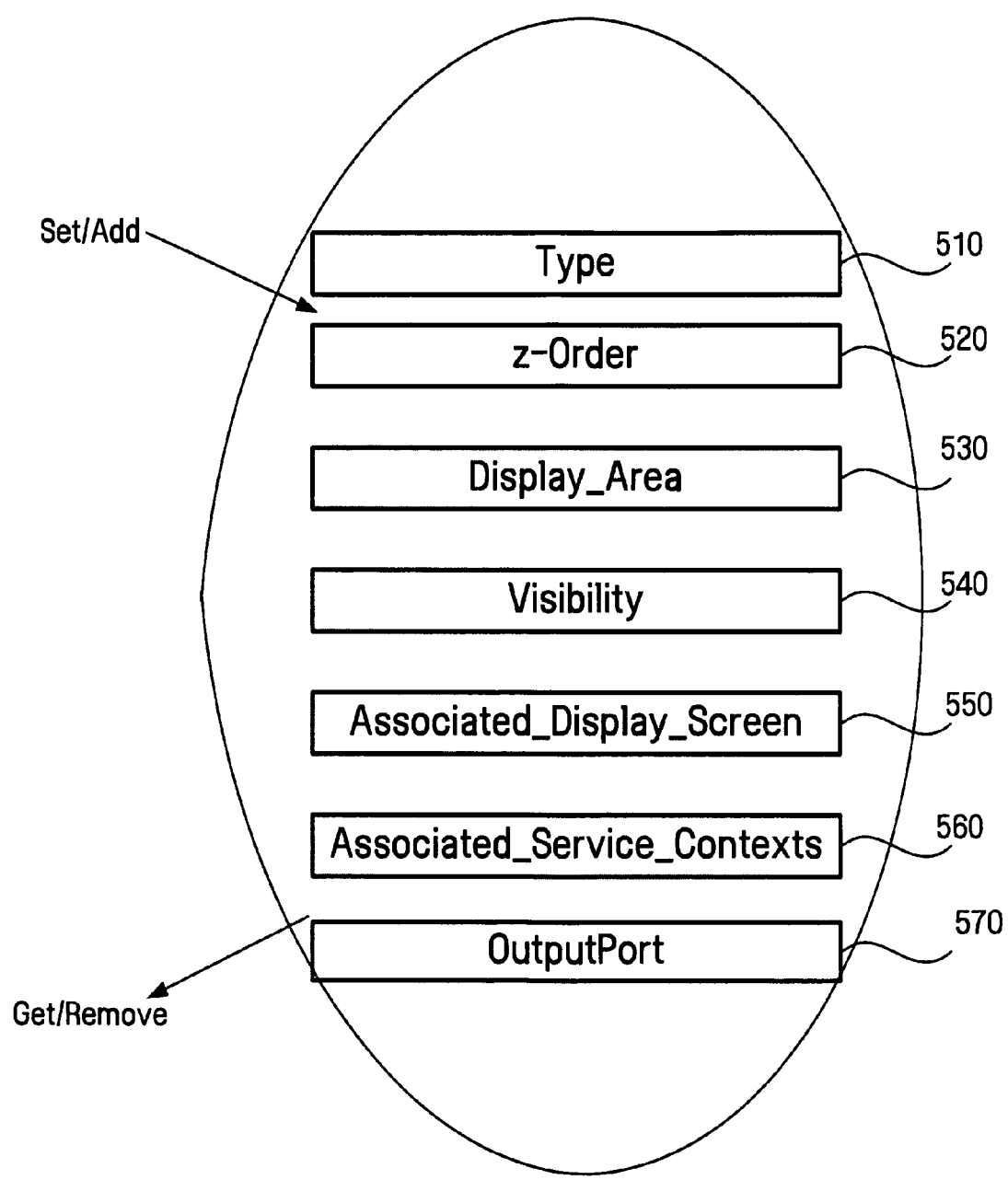
FIG. 6 is a diagram illustrating examples of the types of attribute information and interfaces of a logical screen and a display screen.

FIG. 6 illustrates the attribute information on the screen object and the types of interface for processing the attribute information.

An attribute 'Type' 510 represents whether the screen is a logical screen or a display screen.

Figure 7:
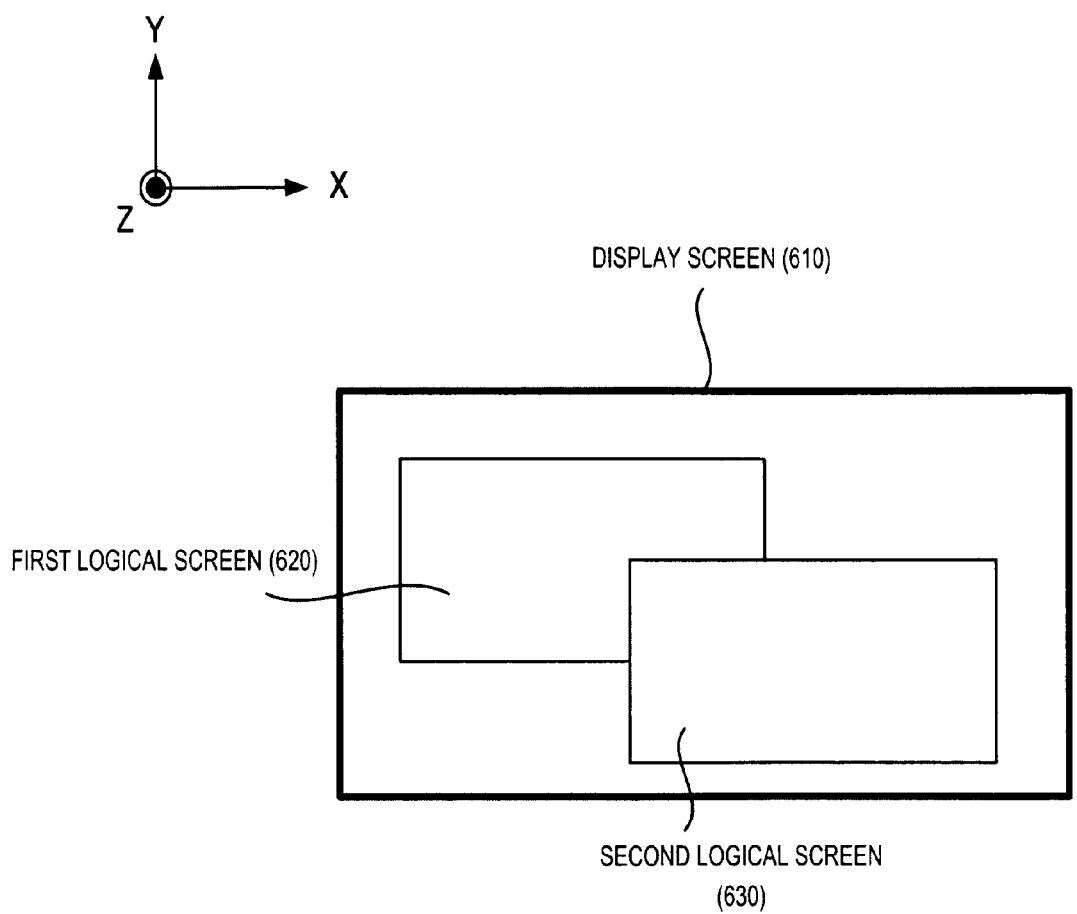
FIG. 7 is a diagram illustrating an attribute 'z-order' of a logical screen according to an exemplary embodiment of the present invention.

An attribute 'z-Order' 520 is for determining in what order a plurality of logical screens are arranged along the z-axis. FIG. 7 illustrates a configuration of logical screens on a physical display device for a combinations of the values of attributes 'z-Order' of the logical screens.

Referring to FIG. 7, first and second logical screens 620 and 630 are respectively mapped to predetermined areas of a display screen 610. In detail, the first logical screen 620 is displayed on the display screen 610, and the second logical screen 630 is displayed on the display screen partially overlapping the first logical screen 620. In other words, the display screen 610, the first logical screen 620, and the second logical screen 630 are sequentially arranged in the direction of the z-axis. In this case, an attribute 'z-Order' of the first logical screen 620 may be set to a value of 1, and an attribute 'z-Order' of the second logical screen 630 may be set to a value of 2. The attributes 'z-Order' of the first and second logical screens 620 and 630 may be set to any numbers or characters as long as they can represent a certain order in which the first and second logical screens 620 and 630 are to be arranged along the z-axis.

Figure 8A:
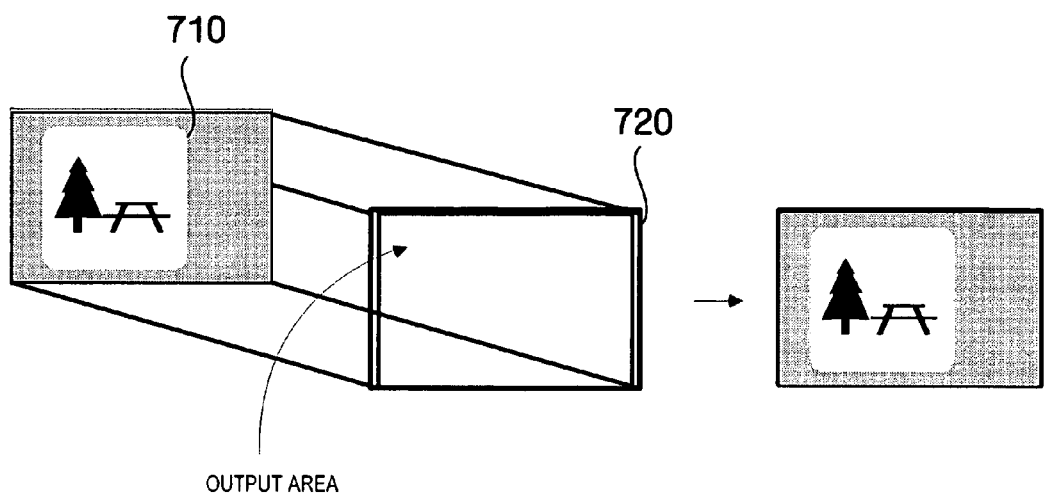
FIGS. 8A and 8B are diagrams each illustrating an attribute 'Display_Area' of a logical screen according to exemplary embodiments of the present invention.
Figure 8B:
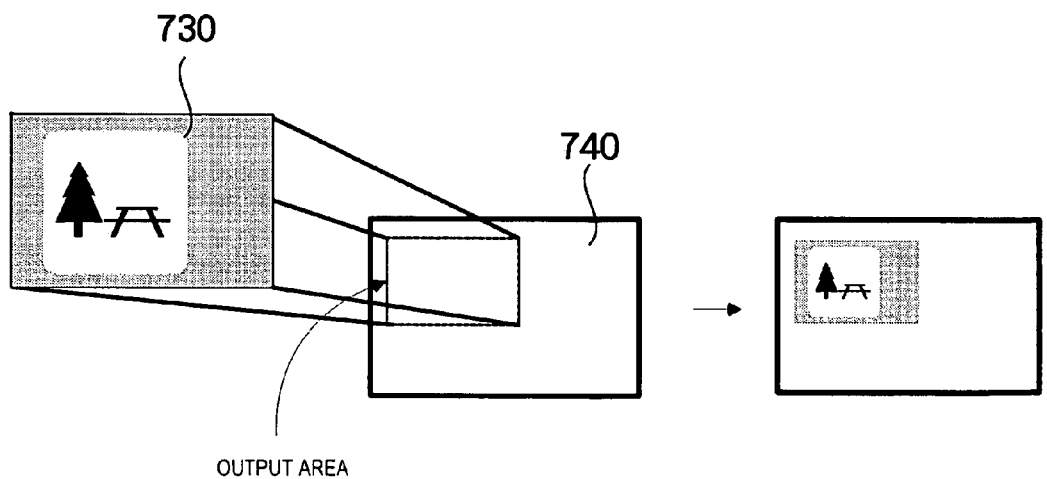

An attribute 'Display_Area' 530 is information regarding a display screen area of a logical screen, as to be illustrated in FIGS. 8A and 8B.

FIG. 8A illustrates that a logical screen 710 is mapped to an entire area of the display screen 720, and FIG. 8B illustrates that a logical screen 730 is mapped to a partial area of the display screen 740.

The attribute 'Display_Area' may include information specifying the two-dimensional coordinates of a predetermined portion of a display screen to which the logical screen is to be mapped or may include information specifying a predetermined location on the display screen and an offset value indicating how much the logical screen deviates from the predetermined location on the display screen.

An attribute 'Visibility' 540 determines whether a logical screen is to be visibly or invisibly displayed on a display screen. It is possible to make a logical screen appear on or disappear from a display screen by altering the value of the attribute 'Visibility' 540.

An attribute 'Associated_Display_Screen' 550 is information regarding display screens associated with a logical screen. A logical screen which is not associated with any display screens may not be displayed on a physical display device nor be transmitted to external output devices.

An attribute 'Associated_Service_Contexts' 560 is information regarding service contexts connected to a logical screen or a display screen. Services set in such service contexts may be displayed on a logical screen or a display screen.

An attribute 'OutputPort' 570 is information regarding devices by which a display screen is to be output, and such devices include display screens, wired/wireless communication media, and various storage media.

Interfaces for identifying or altering the values of the attributes illustrated in FIG. 6 may be provided. Referring to FIG. 6, the interfaces may include an interface 'SET' for setting attribute values or connecting a logical screen to a display screen, an interface 'ADD' for adding attribute values or connecting a logical screen to a service, an interface 'GET' for identifying attribute values, and an interface 'REMOVE' for deleting attribute values. These interfaces may include processes, functions, procedures, or methods that perform their functions, respectively.

For example, a method 'getDisplayScreen(void)' returns a display screen associated with the current screen. In detail, if the current screen is a logical screen, the method 'getDisplayScreen(void)' returns the associated display screen. If the current screen is display screen, the method 'getDisplayScreen(void)' returns reference information regarding the current screen. Further, if the current screen is a logical screen, but there is no associated screen, the method 'getDisplayScreen(void)' returns a value of 'NULL'.

According to another example, a method 'public void setDisplayArea(HScreenRectangle rect) throws SecurityException, IllegalStateException' provides a function for mapping the current logical screen to a predetermined area of the associated display screen. An instance that is provided as a parameter is of a class 'HScreenRectangle' of a package 'org.havi.ui', and has two-dimensional position information. The execution of the methods 'SecurityException' and 'IllegalStateException' may be conducted as an exceptional operation for the method 'setDisplayScreen(HScreen screen)'. The method 'IllegalStateException' may be executed when the current screen is a logical screen or when a portion of a display screen associated with a current logical screen cannot change due to the characteristics of a host platform.

According to still another example, a method 'getOutputArea(void)' returns regional information of a current screen as HScreenRectangle information. If the current screen corresponds to a display screen, the method 'getOutputArea(void)' returns HScreenRectangle information having the same value as HScreenRectangle (0,0,1,1). If the current screen is a logical screen, the method 'getOutputArea(void)' returns information regarding an area on a display screen occupied by the current screen. If the current screen is a logical screen but is not associated with any display screen, the method 'getOutputArea(void)' returns a value 'NULL'.

Certain terms are used throughout the following description to refer to particular interfaces. However, one skilled in the art will appreciate that a particular function is named simply to indicate its functionality. This detailed description of the exemplary embodiments does not intend to distinguish between functions that differ in name but not function.

Figure 9:
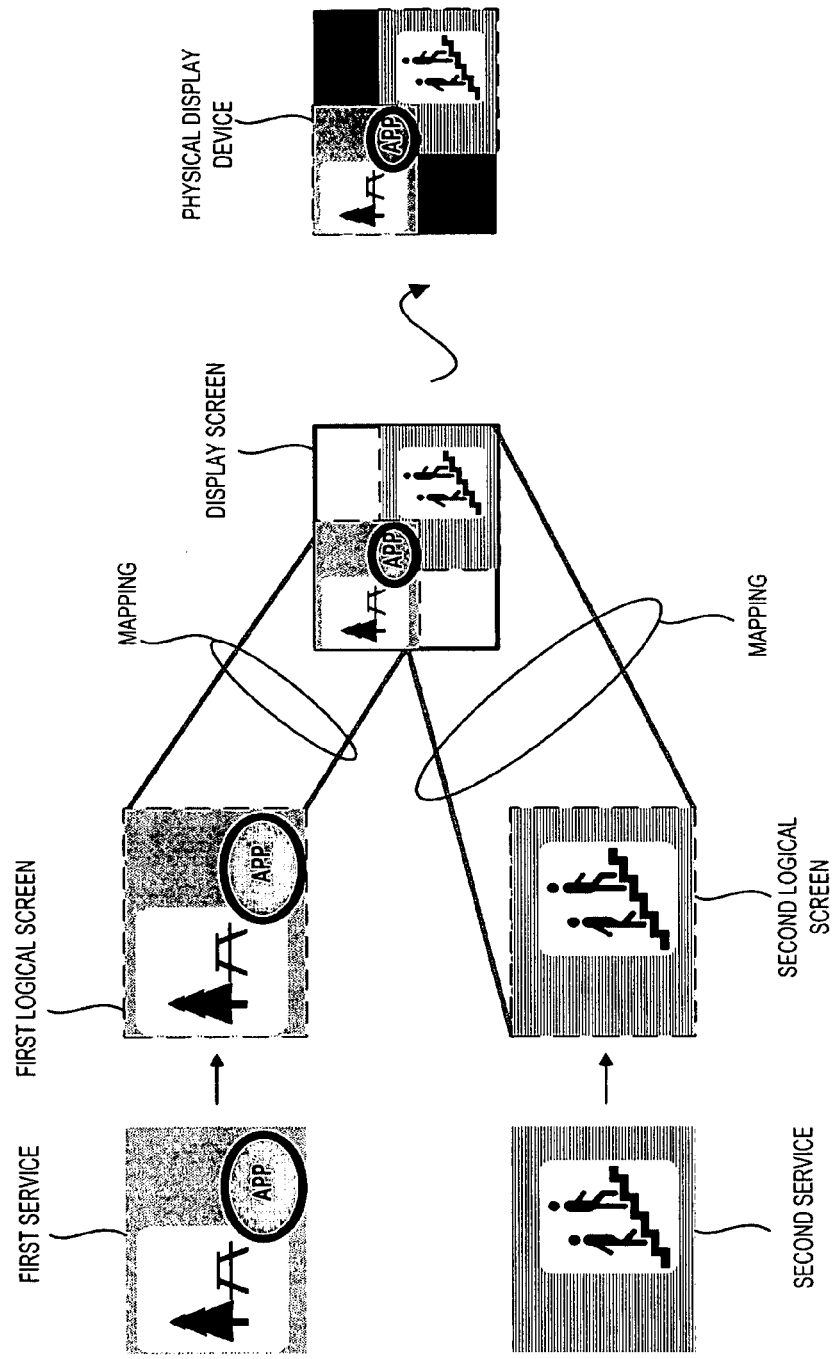
FIG. 9 is a diagram illustrating a method of mapping two services to a display screen according to an exemplary embodiment of the present invention.

FIG. 9 is a diagram illustrating a process that two services are set on two logical screens to be mapped to a single display screen.

Referring to FIG. 9, a first service includes all the three service components, i.e., video, audio, and data components, and a second service includes only video and audio components. However, the present invention does not impose any restrictions on service components, and the first and second services illustrated in FIG. 8 are exemplary.

As illustrated in FIG. 9, the first and second services are displayed on a physical display device in almost the same manner as in the related art. According to the current exemplary embodiment of the present invention, it is possible to display a plurality of services on a physical display device independently of one another without imposing any restrictions on the number of services that can be displayed on a single display screen.

Figure 10:
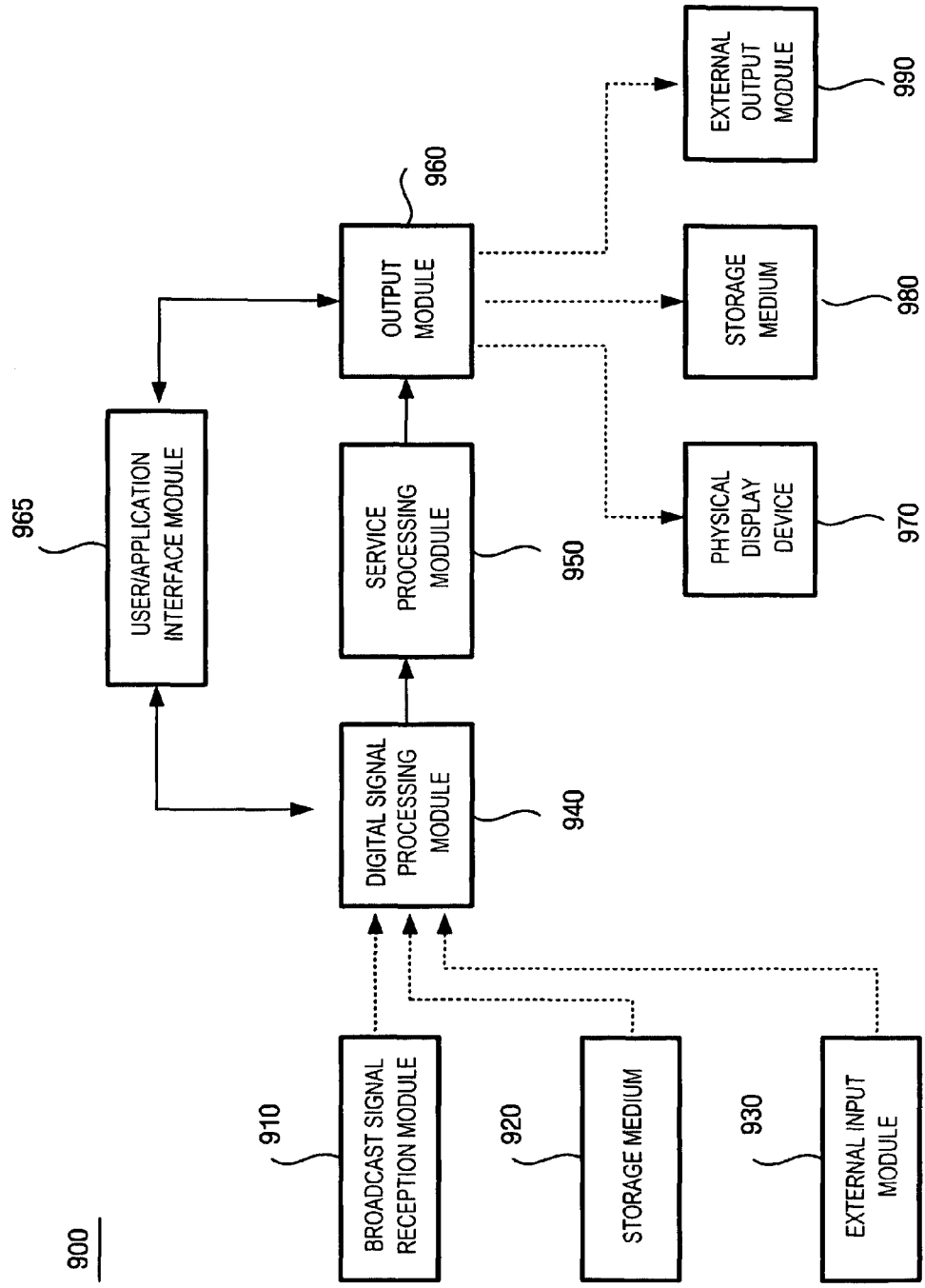
FIG. 10 is a block diagram illustrating a configuration of an apparatus for providing multiple screens according to an exemplary embodiment of the present invention.

FIG. 10 is a block diagram of an apparatus for providing multiple screens according to an exemplary embodiment of the present invention.

Referring to FIG. 10, an apparatus 900 for providing multiple screens includes a digital signal processing module 940, a service processing module 950, an output module 960, and a user/application interface module 965.

Also, the apparatus 900 includes a broadcast signal reception module 910, a storage medium 920, and an external input module 930 as service sources, and includes a display screen 970, a storage medium 980, and an external output module 990 as service output media.

The term 'module', as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The digital signal processing module 940 receives various information of a service such as a multimedia content, e.g., video information, audio information, or data information, from the broadcast signal reception module 910, the storage medium 920, or the external input module 930.

The broadcast signal reception module 910 receives a satellite, terrestrial, or cable broadcast signal and transmits the received broadcast signal, the storage medium 920 stores video information, audio information, or data information of a service, and the external input module 930 receives video information, audio information, or data information of a service from an external device such as a network interface module connected to a network.

The digital signal processing module 940 restores a plurality of services using received service components. The restored services include abstract or non-abstract services.

Here, the phrase 'a plurality of services' refers to two or more services transmitted by the broadcast signal reception module 910 or two or more services respectively transmitted by the broadcast signal reception module 910 and the storage medium 920.

The digital signal processing module 940 may restore services according to selection by a user or an application with the aid of the user/application interface module 965. In this case, the user or the application may select the connection between an arbitrary service and a screen.

The service processing module 950 produces a one or more logical screens and a display screen to display the services restored by the digital signal processing module 940.

The output module 960 maps a plurality of logical screens produced by the service processing module 950 to the display screen. The mapping of the logical screens to the display screen may be conducted using a predefined method or a method set by the user with the aid of the user/application interface module 965.

A service restored by the digital signal processing module 940 may not be processed by the service module 950. Instead, a service restored by the digital signal processing module 940 may be directly mapped to a certain portion of a display screen produced by the output module 960.

A display screen provided by the output module 960 may be displayed on the physical display device 970 or may be stored in the storage medium 980. Examples of the storage medium 980 include computer readable floppy discs, hard discs, CD-ROM. DVD, DVD-ROM, BD (Blu-ray Disc), and semiconductor memories.

Also, a display screen provided by the output module 960 may be transmitted to an external device connected to a network via the external output module 990.

For this, the output module 960 may include a plurality of output ports via which a display screen can be provided. In this case, a display screen can be provided via an output port set in advance as a default or an output port chosen by the user with the aid of the user/application interface module 965.

The user or the application can choose one of a plurality of services or restore desired services using the user/application interface module 965. Also, the user can choose one of a plurality of display screens using the user/application interface module 965.

Since the modules illustrated in FIG. 10 are divided according to their functions, it is possible to be connected to the other modules.

FIG. 11 is a flowchart illustrating a method of dynamically configuring multiple screens according to an exemplary embodiment of the present invention.

In general, video information, audio information, and data information constituting a multimedia content are transmitted in a predetermined format, for example, an MPEG stream format. In operation S1010, an apparatus for providing a service such as a multimedia content service receives video information, audio information, and data information and restores a service based on the video information, the audio information, and the data information. Here, the service restored in operation S1010 may be selected or previously determined by a user or an application. The user may use a menu displayed on the display device or a remote controller to select the connections between an arbitrary screen and a screen. The application may select the connections using an API.

Further, data information includes application information regarding application program for a service, and these application information includes signal information indicating whether the application program can be executed on a PiP screen. Examples of the application information include an application information table (AIT) based on the MHP standard and an eXtended application information table (XAIT) based on the OCAP standard. The signal information may be added to the application information.

Thereafter, in operation S1020, the restored service is set such that it can be displayed on a logical screen. In operation S1030, the logical screen is mapped to a display screen. In operation S1040, the display screen is provided to the user using a display screen, a storage medium, or a network.

The restored service is illustrated in FIG. 11 as being displayed on a physical display device via a logical screen. However, the restored service may be directly displayed on a physical display device without passing through the logical screen.

FIG. 11 illustrates a method of mapping only one service to a display screen for simplicity. However, a plurality of services may be mapped to a display screen with or without passing through a plurality of logical screens. When a display screen is provided to the user in this manner, the user can perform a plurality of services.

Figure 12A:
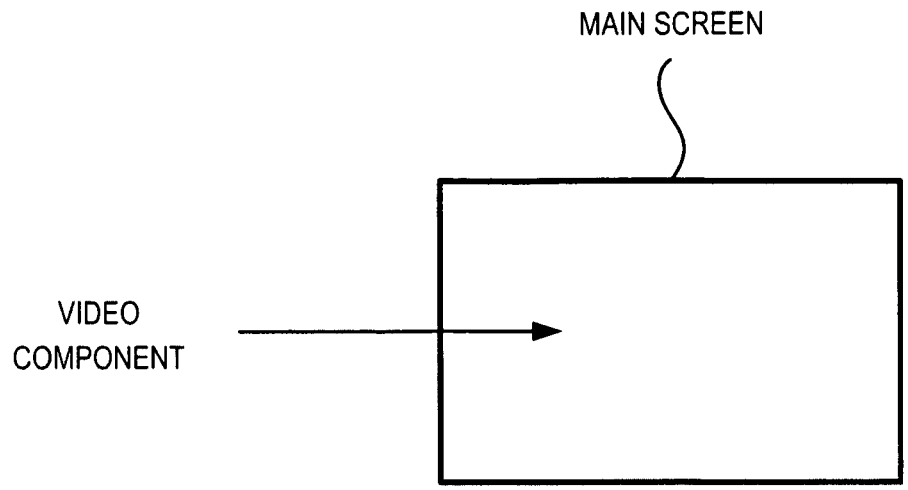
FIGS. 12A and 12B are diagrams illustrating PiP service providing modes according to an exemplary embodiment of the present invention.

When the user or application selects a PiP service, the apparatus 900 for providing multiple screens provides the PiP service into two modes. FIG. 12A illustrates a first mode of the two modes and FIG. 12B illustrates a second mode of the two modes.

Referring to FIG. 12A, in the first mode, only video component for PiP service selected on the main screen is provided without creating a separate logical screen for PiP service, that is, a PiP screen. In the first mode, any application related to the PiP service is not executed or the operation of an application related to the PiP service becomes inactive.

Figure 12B:
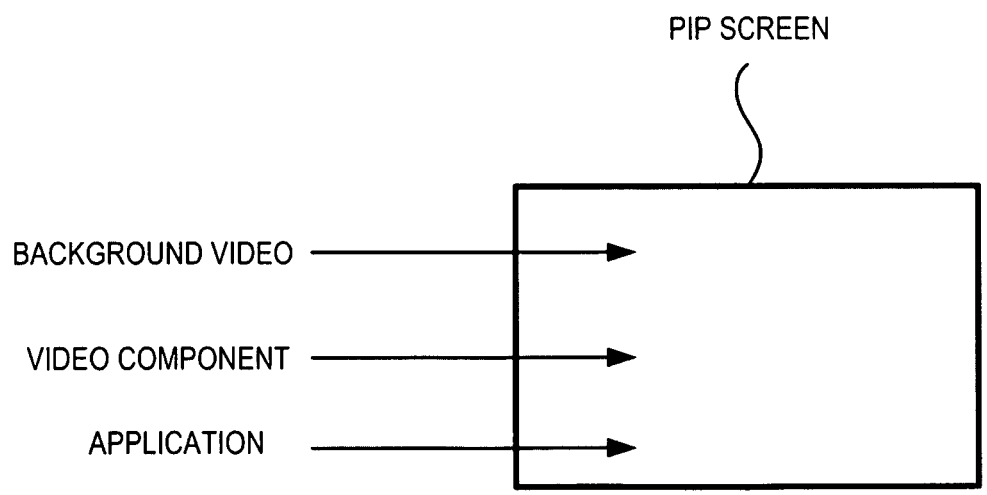

Referring to FIG. 12B, in the second mode, a separate logical screen for PiP service is created to provide the PiP service selected on the created PiP screen. The PiP screen provided in the second mode may include a background video serving as a background screen, or a video component. Further, in the second mode, an application related to the PiP service can be executed. Whether an application related to the PiP service can be executed or not may be determined on the basis of the signal information described above.

It is preferable that the first mode and the second mode cannot be executed at the same time.

The PiP service providing mode may be selected by input of the user or the application through the user/application interface module 965. When the user or the application selects the first mode, the digital signal processing module 940 restores only the video component of the selected PiP service. The restored video component is mapped to the main screen produced by the service processing module 950 and is then displayed on a display screen produced by the output module 960. When the user or the application selects the second mode, the digital signal processing module 940 restores the selected PiP service. The restored service is mapped to the PiP screen created by the service processing module 950 and is then displayed on the display screen produced by the output module 960.

Figure 13:
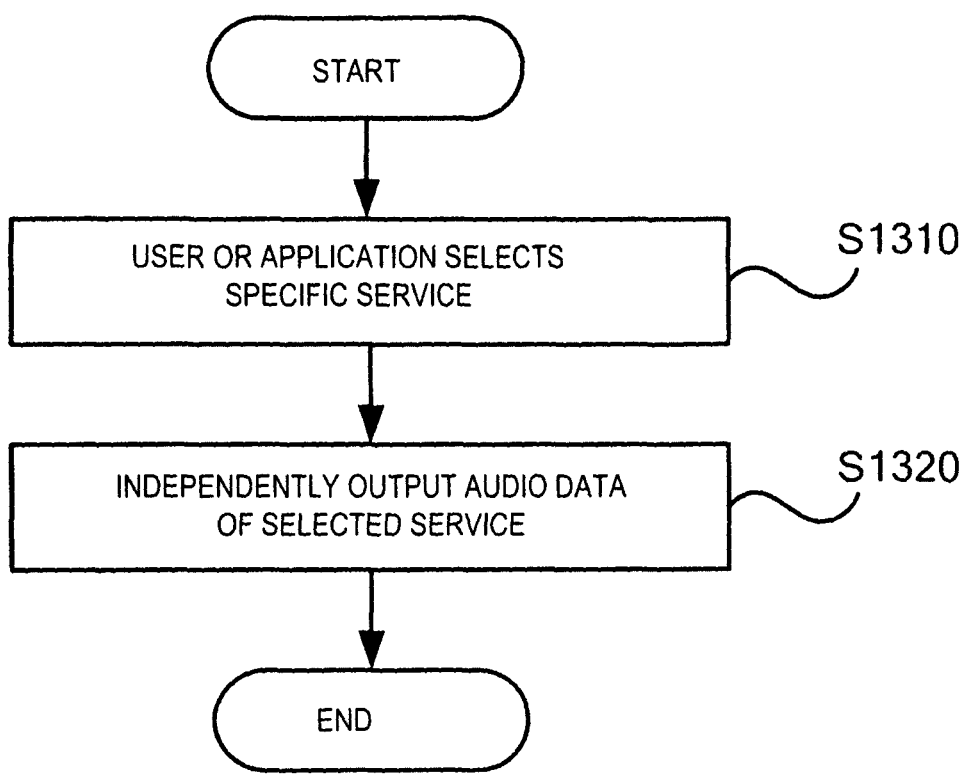
FIG. 13 is a flowchart illustrating a method of independently selecting an audio content and outputting the selected audio content according to an exemplary embodiment of the present invention.

The user or the application can select an audio content of a specific one of a plurality of services provided on the logical screen through the user/application interface module 965 so that the output of the selected audio content can be independently output. This process is illustrated in FIG. 13.

First, the user or the application selects a specific service through the user/application module 965 (S1310).

Then, the digital signal processing module 940 extracts an audio content from the selected service, and the extracted audio content is mapped to a logical screen or a display screen produced by the service processing module 950 and is independently output on the corresponding screen by the output module 960 (S1320). Here, 'independently output' can be understood as, for example, a concept in which an audio content of a specific service is selected and transmitted through an output port mapped to the display screen displaying the specific service simultaneously or exclusively with audio contents of the other services provided on the same screen. It can also be understood as the 'independent output' that audio contents of a plurality of services are output, provided, or stored through different media, respectively. In other words, an audio content need not be provided with other components of the same service and may be independently provided by the user or the application.

The output module 960 is selected by the user or the application and outputs the audio content through a predetermined external output module 990.

When a plurality of audio contents are selected, the individual audio contents may be independently output through the separate external output modules 990 at the same time.

The user or the application can select a desired audio content through the user/application module 965 independently of the other components in the same service.

Figure 14:
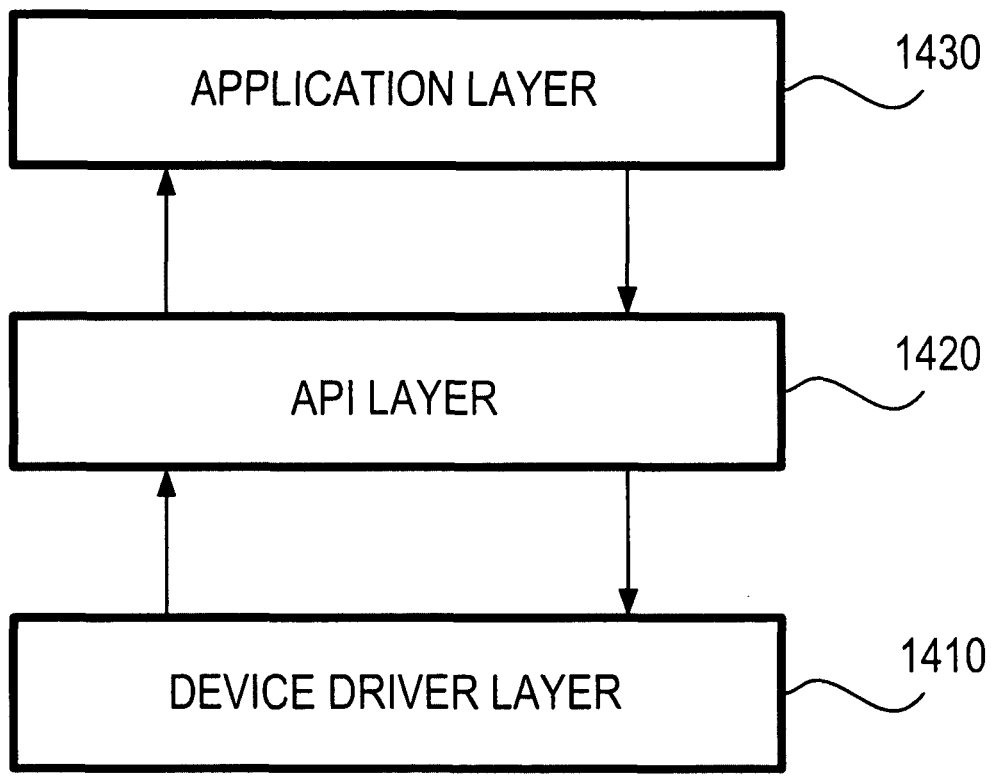
FIG. 14 is a diagram illustrating an example of a software architecture for providing multiple screens according to an exemplary embodiment of the present invention.

FIG. 14 is a diagram illustrating a software architecture for providing multiple screens according to an exemplary embodiment of the present invention.

Referring to FIG. 14, a software architecture 1400 includes a device driver layer 1410, an API layer 1420, and an application layer 1430.

The device driver layer 1410 receives service components from various multimedia content sources and decodes the received service components. Examples of the received service components include video information, audio information, and data information.

The API layer 1420 generates a logical screen and a display screen and maps a service, the logical screen, and the display screen to one another.

The application layer 1430 provides a user interface so that a user can dynamically configure a logical screen which displays a service or transmits a user command to the API layer 1420 so that the API layer 1420 can execute the user command.

In the application layer 1430, audio contents can be selected independently by user or application, and the selected audio contents can be independently output by the device driver layer 1410.

The user enables the device driver layer 1410 with the aid of the application layer 1430 to provide a display screen via a physical display device or to store the display screen in a storage medium. In addition, the user can enable the device driver layer 1410 to transmit a display screen to an external device via a network.

For this, the device driver layer 1410 may include a plurality of output ports which can provide a display screen. Otherwise, API layer 1420 may include the plurality of output ports.

Figure 15:
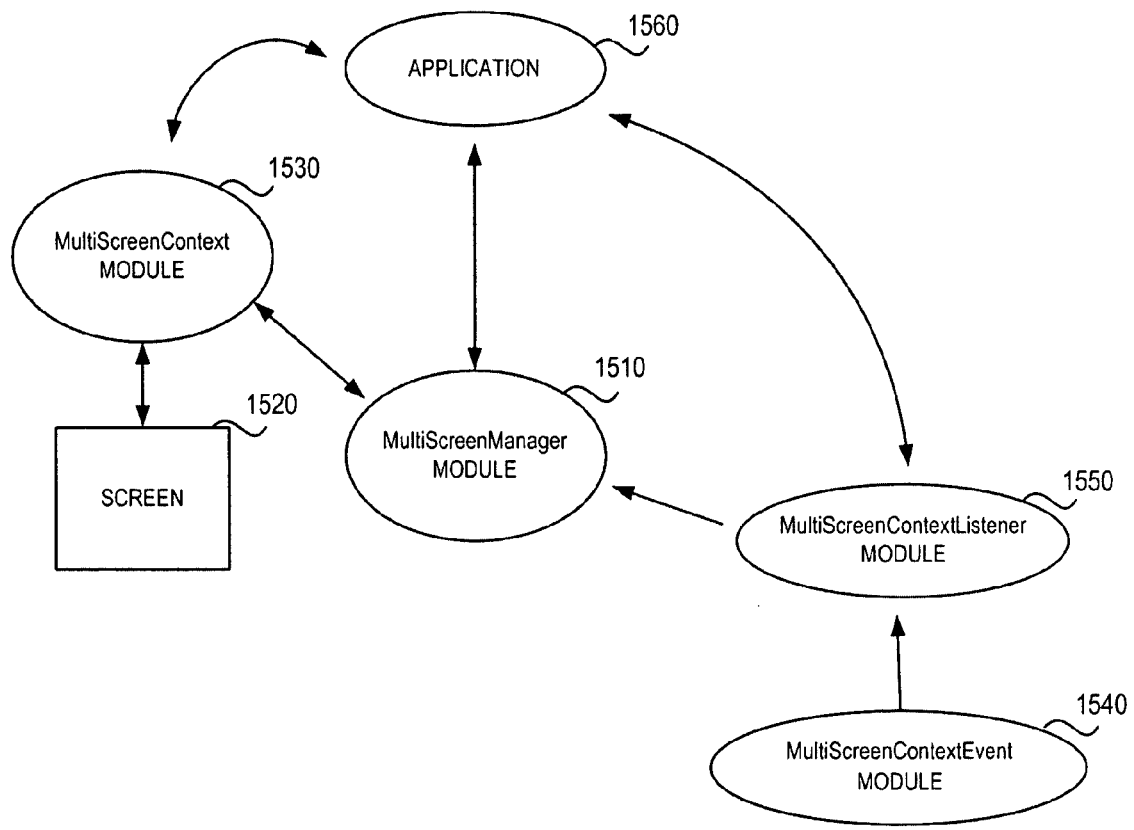
FIG. 15 is a diagram illustrating the relationships among modules constituting an application programming interface (API) layer according to an exemplary embodiment of the present invention.

In order to dynamically configure a plurality of logical screens on a display screen, the API layer 1420 may include a plurality of software modules, e.g., a multi-screen manager module 'MultiscreenManager', a multi-screen context module 'MultiscreenContext', a multiscreen context listener module 'MultiscreenContextListener', and a multi-screen context event module 'MultiscreenContextEvent', as illustrated in FIG. 15.

The multi-screen manager module 1510 manages the multi-screen context module 1530, searches for a desired screen, displays information specifying what devices are shared by screens, registers the multi-screen context listener module 1550, or cancels the registration of the screen context listener module 1550.

The multi-screen context module 1530 is an interface object associated with a screen object 1520 and determines whether the screen object 1520 is to become a logical screen or a display screen according to an interface operation performed by the multi-screen context module 1530. Various attributes illustrated in FIG. 6 may be set in the multi-screen context module 1530. The multi-screen context module 1530 can provide the functions 'SET', 'ADD', 'GET', and 'REMOVE' described above with reference to FIG. 6.

When attribute information of the screen object 1520 is altered by the multi-screen context module 1530, the multi-screen context event module 1540 serves as an event class announcing that the attribute information of the screen object 1520 has been changed, and the multi-screen context listener module 1550 serves as a listener interface object which can be realized in a predetermined application class which attempts to receive an event prompted by the multi-screen context event module 1540.

An application 1560 is a module which is driven on the application layer 1130. The application 1560 allows the user to choose a desired service and to freely arrange a plurality of logical screens on a display screen.

In detail, the application 1560 transmits various commands which allow the user to dynamically configure and manage logical screens to the multi-screen manager module 1510, and the multi-screen manager module 1510 controls operations corresponding to the various commands to be executed through the multi-screen context module 1530.

The multi-screen context module 1530 is associated with the screen object 1520 and manages the attribute information of the screen object 1520 illustrated in FIG. 6. In order to manage the attribute information of the screen object 1220, the multi-screen context module 1530 may include a variety of functions or methods.

The multi-screen manager module 1510 receives service components provided by various service sources from the device driver layer 1510 and can operate to display the received service components on a logical screen or a display screen. Such a function may be performed by a separate module not illustrated.

Figure 16:
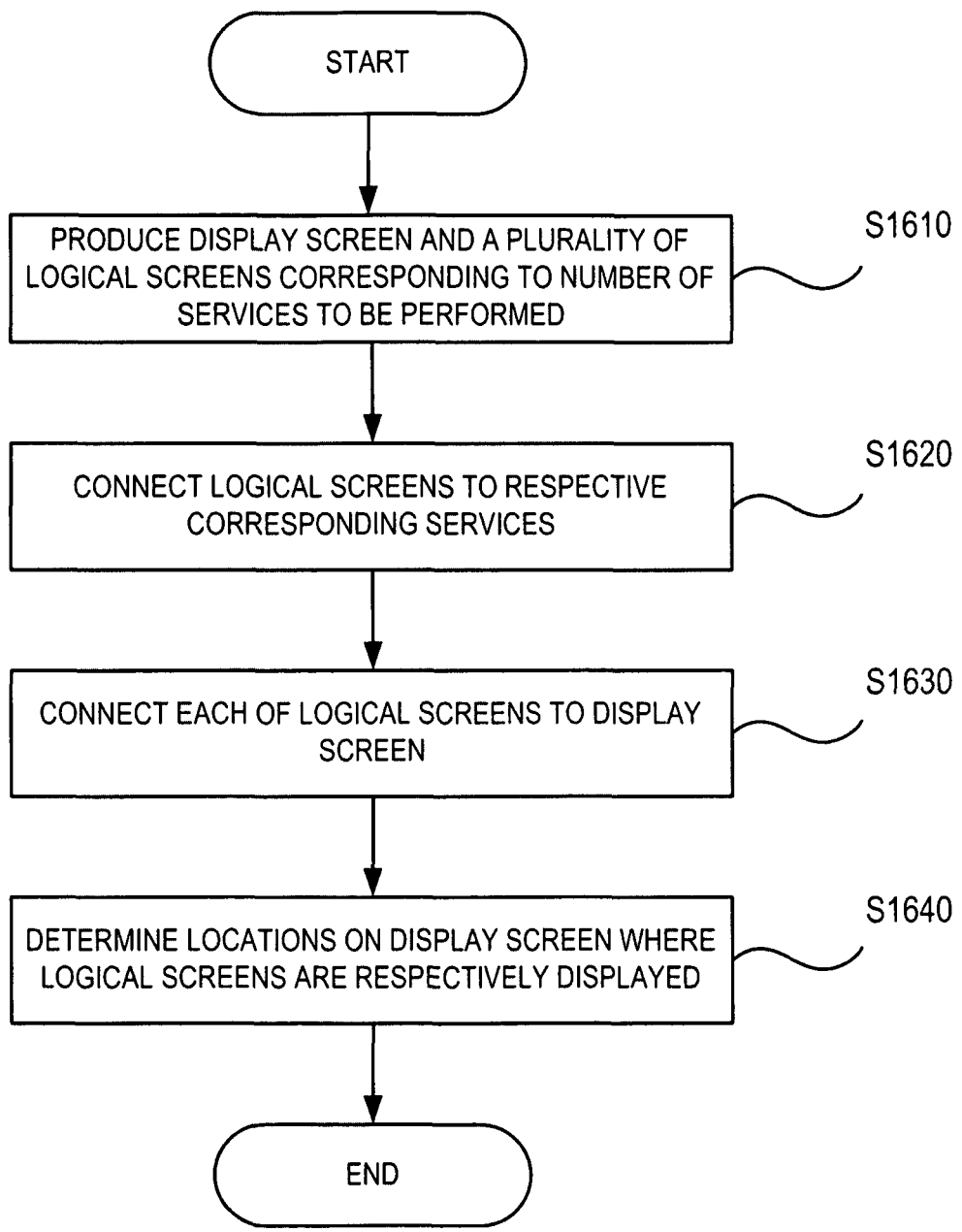
FIG. 16 is a flowchart illustrating a method of displaying a plurality of services that are displayed on respective corresponding logical screens on a display screen by the modules illustrated in FIG. 15 according to an exemplary embodiment of the present invention.

FIG. 16 is a flowchart illustrating a method of displaying a plurality of services displayed on respective corresponding logical screens by the modules illustrated in FIG. 15 on a display screen according to an exemplary embodiment of the present invention.

Referring to FIG. 16, in operation S1610, the multi-screen manager module 1510 produces a display screen and a number of logical screens corresponding to the number of services to be performed.

In operation S1620, the multi-screen manager module 1510 connects the logical screens to respective corresponding services received from the device driver layer 1410. The multi-screen manager module 1510 may call a method 'addServiceContext' for each of the logical screens by setting service context objects of the received services as parameters for the logical screens services. The method 'addServiceContext' connects a logical screen to a service and may be provided by the multi-screen context module 1530.

In operation S1630, once the logical screens are connected to the respective services, the multi-screen manager module 1510 connects the logical screens to the display screen. At this time, the multi-screen manager module 1510 may call a method 'setDisplayScreen' for each of the logical screens by setting a display screen object to which the logical screens are connected as a parameter. The method 'setDisplayScreen' connects a logical screen to a display screen and may be provided by the multi-screen context module 1530.

A method 'setDisplayScreensetDisplayScreen' may be set to 'public void setDisplayScreensetDisplayScreen(HScreen screen) throws SecurityException, Illegal StateException', and this method allows an instance 'HScreen' that is provided as a parameter to be associated with the current logical screen. In this case, the instance 'HScreen' is preferably a display screen.

A parameter of the method 'setDisplayScreen(HScreen screen)' may include a value of 'NULL'. In this case, when the method 'setDisplayScreen(HScreen screen)' is executed without exception handling, the current logical screen is no longer associated with the display screen.

The execution of the methods 'SecurityException' and 'IllegalStateException' may be conducted as an exceptional operation for the method 'setOutputScreen(HScreen screen)'.

The method 'IllegalStateException' may be executed when a current screen is a logical screen or when a portion of a display screen associated with a current logical screen cannot change due to the characteristics of a host platform.

In operation S1640, areas on the display screen to which the logical screens are to be respectively mapped are determined. At this time, a predetermined method provided by the multi-screen context module 1530 can be called to determine an area on the display screen where the logical screens are to be displayed.

According to the present invention, it is possible to perform a plurality of services provided by various sources such as cable broadcasts, terrestrial broadcasts, various storage media, and external inputs, in various manners using a single physical display screen.

While the present invention has been particularly illustrated and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. An apparatus comprising:
   a receiving unit to receive at least one service, wherein the service comprises at least one of a video component, an audio component and a data component;
   a first module which associates each of a plurality of logical screens with each of the received at least one service, wherein a plurality of screens comprise the plurality of logical screens and a display screen;
   a second module which associates each of the plurality of logical screens with the display screen;
   a third module that configures state information of each of screen objects categorized into a logical screen object and a display screen object, based on associations of each of the screen objects with objects including the at least one received service, the plurality of logical screens, the at least one display screen and at least one output port;

an abstract services module that, when an abstract service is received, provides the abstract service for display on the display screen independent of the plurality of the logical screens; and a processor which, in cooperation with the first module, the second module and the third module, associates the display screen, which is associated with at least one logical screen of the plurality of logical screens associated with the audio component of the received at least one service, with the at least one output port, wherein the processor further assigns audio focus to the at least one logical screen associated with the audio component of the received at least one service to output the corresponding audio component, by a user or application, wherein the abstract service is independent of broadcast channels, and wherein the plurality of the logical screens are virtual screens comprising background screens and executed services, and the logical screens are mapped to a display screen.

2. The apparatus of claim 1 further comprising a fourth module which associates each of the plurality of logical screens with a corresponding area of the display screen.

3. The apparatus of claim 1, wherein a logical screen of the plurality of logical screens includes at least one of a background image, a video raster and a graphic raster.

4. The apparatus of claim 1, wherein the state information of each of the plurality of logical screens includes at least one of information regarding the received at least one service associated with the logical screen, information regarding the display screen associated with the logical screen, information regarding the corresponding area of the display screen associated with the logical screen and information regarding the at least one output port associated with the logical screen.

5. The apparatus of claim 1, wherein the display screen associated with the at least one logical screen and the at least one output port associated with the at least one logical screen are associated by configuring state information related to the at least one logical screen to present the received at least one service.

6. The apparatus of claim 1, wherein the display screen associated with an audio component among a plurality of components of the received at least one service is independently associated with the at least one output port.

7. The apparatus of claim 1, wherein the display screen associated with a plurality of the audio component of the received at least one service is associated with a plurality of output ports, respectively.

8. The apparatus of claim 1, wherein the third module further manages the plurality of screens provided to present the received at least one service.

9. The apparatus of claim 1, wherein the third module further discovers the state information related to the plurality of screens.

10. The apparatus of claim 1, wherein an output port is associated with one of a physical device rendering the audio component of the received at least one service associated with the display screen, an external output port to which the audio component is output, a storage device in which the audio component is stored, and an external device to which the audio component is transmitted via a network.

11. A method in a device providing a plurality of screens for presenting at least one of services, the method comprising:

receiving at least one service, wherein the at least one service comprises at least one of a video component, an audio component and a data component;

associating each of a plurality of logical screens with each of the received at least one service, wherein the plurality of screens comprise the plurality of logical screens and a display screen;

associating each of the plurality of logical screens with the display screen;

configuring state information of each of screen objects categorized into a logical screen object and a display screen object, based on associations of each of the screen objects with objects including the at least one received service, the plurality of logical screens, the at least one display screen and at least one output port;

assigning audio focus to at least one logical screen associated with the audio component of the received at least one service to output the corresponding audio component, by a user or application;

associating the display screen, which is associated with at least one logical screen associated of the plurality of logical screens associated with the audio component of the received the at least one service, with at least one output port, and providing an abstract service, when the abstract service is received, for display on the display screen independent of the plurality of the logical screens;

wherein at least one of the associating each of a plurality of logical screens with each of the received at least one service, the associating each of the plurality of logical screens with the display screen, and the associating the display screen with at least one output port is performed using a processor of the device, wherein the abstract service is independent of broadcast channels, and wherein the plurality of the logical screens are virtual screens comprising background screens and executed services, and the logical screens are mapped to a display screen.

12. The method of claim 11, further comprising associating each of the plurality of logical screens with a corresponding area of the display screen.

13. The method of claim 11, wherein a logical screen of the plurality of logical screens includes at least one of a background image, a video raster and a graphic raster.

14. The method of claim 11, wherein the state information of each of the plurality of logical screens includes at least one of information regarding the received at least one service associated with the logical screen, information regarding the display screen associated with the logical screen, information regarding the corresponding area of the display screen associated with the logical screen and information regarding at least one output port associated with the logical screen.

15. The method of claim 11, wherein the display screen associated with the at least one logical screen and at least one output port associated with the at least one logical screen are associated by configuring state information related to the at least one logical screen to present the received at least one service.

16. The method of claim 11, wherein in the associating the display screen with at least one output port, the display screen associated with an audio component among a plurality of components of the received at least one service is independently associated with the at least one output port.

17. The method of claim 11, wherein in the associating the display screen with at least one output port, the display screen associated with a plurality of the audio component of the received at least one service is associated with a plurality of output ports, respectively.

18. The method of claim 11, further comprising managing the plurality of screens provided to present the received at least one service.

19. The method of claim 11, further comprising discovering the state information related to the plurality of screens.

20. The method of claim 11, wherein an output port is associated with one of a physical device rendering the audio component of the received at least one service associated with the display screen, an external output port to which the audio component is output, a storage device in which the audio component is stored, and an external device to which the audio component is transmitted via a network.

21. A non-transitory computer readable medium having embodied thereon a computer program for executing a method, the method comprising:
receiving at least one service, wherein the at least one service comprises at least one of a video component, an audio component and a data component;
associating each of a plurality of logical screens with each of the received at least one service, wherein the plurality of screens comprise the plurality of logical screens and a display screen;
associating each of the plurality of logical screens with the display screen;
configuring state information of each of screen objects categorized into a logical screen object and a display screen object, based on associations of each of the screen objects with objects including the at least one received service, the plurality of logical screens, the at least one display screen and at least one output port;
assigning audio focus to at least one of the logical screens associated with the audio component of the received at least one service to output the corresponding audio component, by a user or application;
associating the display screen, which is associated with at least one logical screen associated of the plurality of logical screens associated with the audio component of the received at least one service, with the at least one output port; and
providing an abstract service, when the abstract service is received, for display on the display screen independent of the plurality of the logical screens,
wherein the abstract service is independent of broadcast channels, and
wherein the plurality of the logical screens are virtual screens comprising background screens and executed services, and the logical screens are mapped to a display screen.

22. The non-transitory computer readable medium of claim 21, wherein the method further comprises associating each of the plurality of logical screens with a corresponding area of the display screen.

23. The non-transitory computer readable medium of claim 21, wherein a logical screen of the plurality of logical screens includes at least one of a background image, a video raster and a graphic raster.

24. The non-transitory computer readable medium of claim 21, wherein the state information of each of the plurality of logical screens includes at least one of information regarding the received at least one service associated with the logical screen, information regarding the display screen associated with the logical screen, information regarding the corresponding area of the display screen associated with the logical screen and information regarding the at least one output port associated with the logical screen.

25. The non-transitory computer readable medium of claim 21, wherein the display screen associated with the at least one logical screen and at least one output port associated with the at least one logical screen are associated by configuring state information related to the at least one logical screen to present the received at least one service.

26. The non-transitory computer readable medium of claim 21, wherein in the associating the display screen with at least one output port, the display screen associated with an audio component among a plurality of components of the received at least one service is independently associated with the at least one output port.

27. The non-transitory computer readable medium of claim 21, wherein in the associating the display screen with at least one output port, the display screen associated with a plurality of the audio component of the received at least one service is associated with a plurality of output ports, respectively.

28. The non-transitory computer readable medium of claim 21, wherein the method further comprises managing the plurality of screens provided to present the received at least one service.

29. The non-transitory computer readable medium of claim 21, wherein the method further comprises discovering the state information related to the plurality of screens.

30. The non-transitory computer readable medium of claim 21, wherein an output port is associated with one of a physical device rendering the audio component of the received at least one service associated with the display screen, an external output port to which the audio component is output, a storage device in which the audio component is stored, and an external device to which the audio component is transmitted via a network.

* * * * *